United States Patent
Kobayashi et al.

(10) Patent No.: US 9,826,148 B2
(45) Date of Patent: Nov. 21, 2017

(54) IMAGE PROCESSING APPARATUS AND IMAGE PROCESSING METHOD FOR ADJUSTING TEXTURE OF AN IMAGE

(71) Applicant: CANON KABUSHIKI KAISHA, Tokyo (JP)

(72) Inventors: Satoru Kobayashi, Tokyo (JP); Hironori Kaida, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/186,228

(22) Filed: Feb. 21, 2014

(65) Prior Publication Data
US 2014/0247375 A1 Sep. 4, 2014

(30) Foreign Application Priority Data
Mar. 4, 2013 (JP) ................................ 2013-042360

(51) Int. Cl.
H04N 5/232 (2006.01)
H04N 9/73 (2006.01)

(52) U.S. Cl.
CPC ......... *H04N 5/23229* (2013.01); *H04N 9/735* (2013.01)

(58) Field of Classification Search
CPC .................................................. H04N 5/2256
USPC ......................................... 348/223.1; 362/16
See application file for complete search history.

(56) References Cited

U.S. PATENT DOCUMENTS

2004/0263678 A1* 12/2004 Kawakami ........... H04N 5/2354 348/371
2010/0124041 A1* 5/2010 Druchinin ....................... 362/16

FOREIGN PATENT DOCUMENTS

| JP | 2003-174619 A | 6/2003 |
| JP | 2003-189229 A | 7/2003 |
| JP | 2012-257040 A | 12/2012 |

OTHER PUBLICATIONS

The documents cited herein were cited in the Feb. 3, 2017 Japanese Office Action, a copy of which is enclosed without an English Translation, that issued in Japanese Patent Application No. 2013042360.

* cited by examiner

*Primary Examiner* — Joel Fosselman
(74) *Attorney, Agent, or Firm* — Cowan, Liebowitz & Latman, P.C.

(57) ABSTRACT

An image processing apparatus comprises an input unit configured to input an image; an acquisition unit configured to acquire a parameter for adjusting an image quality, reference environment information serving as a reference when adjusting the image quality by applying the parameter, and shooting environment information representing an environment upon shooting the image; an adjustment unit configured to adjust the image by using the parameter; and a determination unit configured to determine, based on a difference between the reference environment information and the shooting environment information, whether adjustment by the parameter is necessary.

9 Claims, 18 Drawing Sheets

FIG. 8

IMAGE MAY NOT BE CORRECTED TO DESIRED TEXTURE BECAUSE COLOR TEMPERATURE INFORMATION DESCRIBED IN COLOR GRADING TARGET IMAGE AND COLOR TEMPERATURE INFORMATION DESCRIBED IN GENERATED COLOR GRADING INFORMATION ARE DIFFERENT

CONTINUE?

COLOR GRADING TARGET IMAGE : 3000K
GENERATED COLOR GRADING INFORMATION : 5500K

| CONTINUE | STOP |

COLOR TEMPERATURE OF OBJECT
5600K

COLOR TEMPERATURE OF OBJECT
7000K

IMAGE PROCESSING APPARATUS AND IMAGE PROCESSING METHOD FOR ADJUSTING TEXTURE OF AN IMAGE

BACKGROUND OF THE INVENTION

Field of the Invention

The present invention relates to an image processing technique of adjusting the texture of an image.

Description of the Related Art

Recently, image capturing apparatuses, such as a digital camera, which capture an object such as a person and record it as a moving image have been used on the digital cinema production site. On the digital cinema production site, color grading for adjusting the quality of a shot image to a desired texture is generally performed in addition to cut editing. The color grading processing is performed using a color grading apparatus in an editing studio or the like after shooting. However, in another type of workflow, rough color grading is performed upon shooting at the filming location and only fine color grading is performed after shooting. By performing rough color grading in advance, the load of color grading performed after shooting can be decreased.

When performing color grading, it takes time to perform all color grading processing manually from scratch and bring the image quality close to a desired texture. Especially in color grading at the filming location, the situation of an object may change every moment. It is therefore necessary to quickly perform color grading and adjust the image quality to a desired texture.

To achieve this, there is known a workflow in which color grading parameters for reproducing a desired texture are read to bring the image quality close to a target texture to a certain degree, and then final adjustment is performed manually. This color grading processing generally uses ASC-CDL parameters. The ASC-CDL (to be also referred to as a CDL (Color Decision List) hereinafter) has been generated and recommended by the ASC (American Society of Cinematographers) Technology Committee. At present, the ASC-CDL is used in many color grading processes. The CDL defines the methods of calculating the gain, gamma, and the like, as basic color grading processing. By generating in advance a CDL which reproduces a desired texture and performing color grading by using the CDL, the number of color grading processes can be greatly reduced.

For example, Japanese Patent Laid-Open No. 2003-189229 has disclosed a technique for obtaining an image of a desired texture by using image editing information like the above-mentioned CDL.

As described above, the number of color grading processes can be greatly reduced by generating in advance a CDL which brings the image quality close to a desired texture, and performing color grading by using the CDL. However, even if color grading is performed using the CDL generated in advance, a texture assumed from the CDL may not be obtained. For example, when color grading is performed to obtain an overall cold color texture in order to express a cold texture, the CDL values need to be changed depending on the color temperature of a light source which illuminates an object. This is because, even when color grading is performed to obtain the same cold color texture, the correction amount of color correction differs between a case in which a warm color scene having a low color temperature of the light source is changed into a desired cold color texture, and a case in which a cold color scene originally having a high color temperature of the light source is changed into a desired cold color texture. For this reason, the image quality cannot be brought close to a desired texture assumed from the CDL unless processing is performed using a CDL suited to an image to undergo color grading.

SUMMARY OF THE INVENTION

The present invention has been made in consideration of the aforementioned problems, and realizes an image processing technique capable of recording, in association with environment information obtained from an image, parameters used in processing of adjusting the texture of an image, such as color grading.

In order to solve the aforementioned problems, the present invention provides an image processing apparatus comprising: an input unit configured to input an image; an acquisition unit configured to acquire a parameter for adjusting an image quality, reference environment information serving as a reference when adjusting the image quality by applying the parameter, and shooting environment information representing an environment upon shooting the image; an adjustment unit configured to adjust the image by using the parameter; and a determination unit configured to determine, based on a difference between the reference environment information and the shooting environment information, whether adjustment by the parameter is necessary.

In order to solve the aforementioned problems, the present invention provides an image processing apparatus comprising: an input unit configured to input an image; an acquisition unit configured to acquire a parameter for adjusting an image quality, reference environment information serving as a reference when adjusting the image quality by applying the parameter, and shooting environment information representing an environment upon shooting the image; an adjustment unit configured to adjust the image by using the parameter; and a correction unit configured to correct the parameter based on a difference between the reference environment information and the shooting environment information.

In order to solve the aforementioned problems, the present invention provides an image processing apparatus comprising: a setting unit configured to set a parameter for adjusting an image quality, and reference environment information serving as a reference when adjusting the image quality by applying the parameter; a shooting unit; and a recording unit configured to record, on a recording medium in association with an image obtained by the shooting unit, the parameter and the environment information that are set by the setting unit.

In order to solve the aforementioned problems, the present invention provides an image processing method comprising the steps of: inputting an image; acquiring a parameter for adjusting an image quality, reference environment information serving as a reference when adjusting the image quality by applying the parameter, and shooting environment information representing an environment upon shooting the image; adjusting the image by using the parameter; and determining, based on a difference between the reference environment information and the shooting environment information, whether adjustment by the parameter is necessary.

In order to solve the aforementioned problems, the present invention provides an image processing method comprising the steps of: inputting an image; acquiring a parameter for adjusting an image quality, reference environment information serving as a reference when adjusting the image quality by applying the parameter, and shooting environment information representing an environment upon shooting the image; adjusting the image by using the parameter; and correcting the parameter based on a difference between the reference environment information and the shooting environment information.

In order to solve the aforementioned problems, the present invention provides an image processing method comprising the steps of: setting a parameter for adjusting an image quality, and reference environment information serving as a reference when adjusting the image quality by applying the parameter; and recording, on a recording medium in association with an image obtained by shooting, the set parameter and environment information.

According to the present invention, parameters used in processing of adjusting the texture of an image, such as color grading, can be recorded in association with environment information obtained from an image. Thus, parameters suited to an image can be selected to quickly generate an image of a desired texture.

Further features of the present invention will become apparent from the following description of exemplary embodiments (with reference to the attached drawings).

BRIEF DESCRIPTION OF THE DRAWINGS

FIG. 8 is a view exemplifying a warning screen displayed in the color grading processing of FIG. 7;

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

An embodiment in which an image processing apparatus according to the present invention is applied to, for example, an image capturing apparatus such as a digital camera will be described below.

<Apparatus Configuration>

An outline of the configuration and functions of the image capturing apparatus according to the embodiment of the present invention will be explained with reference to FIG. 1.

An image capturing apparatus 100 according to the embodiment has a function of recording, in association with environment information upon shooting an image to be processed, color grading parameters (CDL) generated when performing color grading for adjusting an image to have a desired texture.

Figure 1:
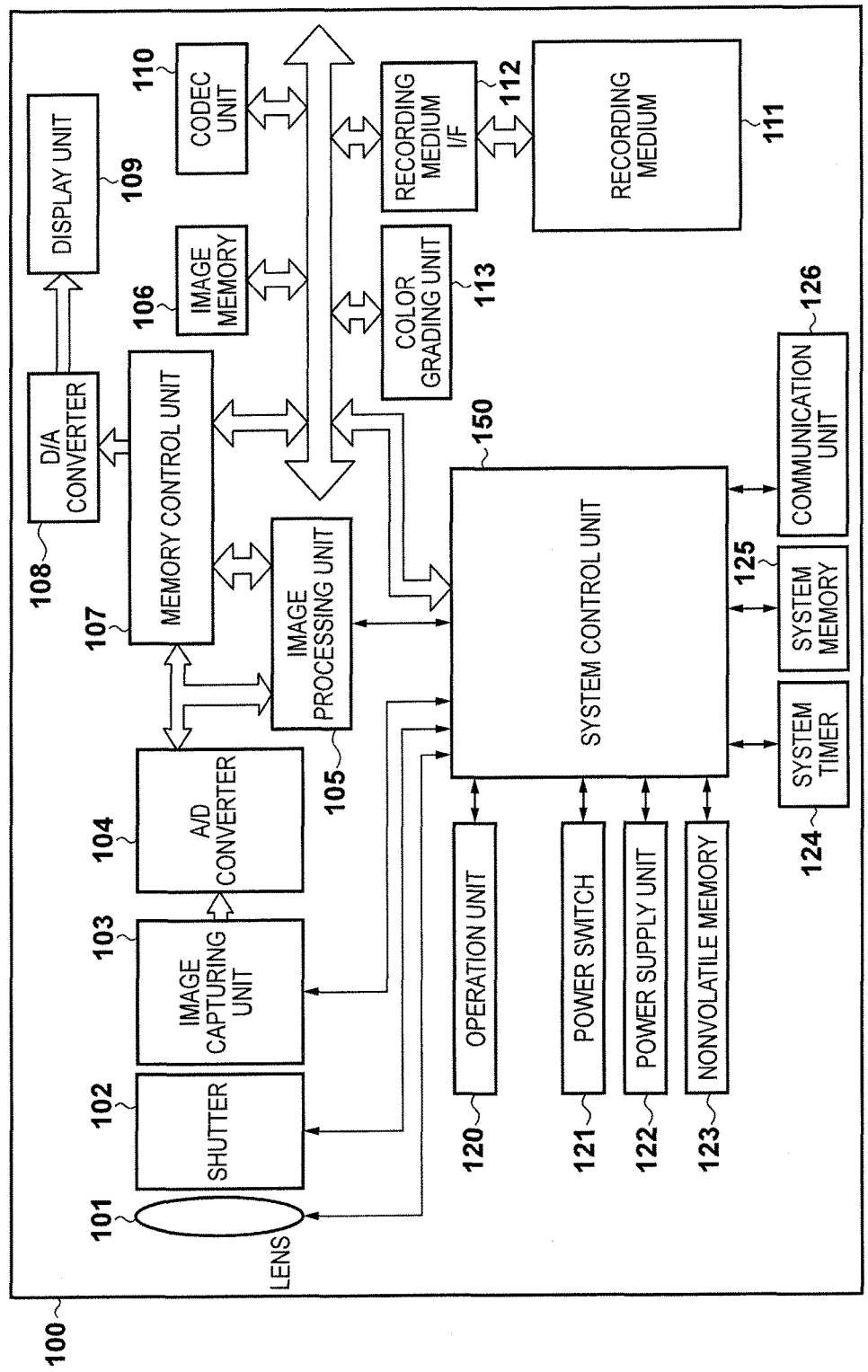
FIG. 1 is a block diagram showing the configuration of an image capturing apparatus according to an embodiment.

Referring to FIG. 1, a photographing lens 101 includes a zoom lens and focusing lens. A shutter 102 is a shutter having a diaphragm function. An image capturing unit 103 is an image sensor, which is constituted by a CCD or CMOS or the like, for converting the optical image of an object to an electric signal. An A/D converter 104 converts analog signals, which are output from the image capturing unit 103, to a digital signal.

An image processing unit 105 performs predetermined pixel interpolation, resize processing, color processing, and gamma processing for data from the A/D converter 104 or data from a memory control unit 107, and outputs Bayer RGB data, ACES_R, ACES_G, and ACES_B signals, or a luminance signal Y and color difference signals R-Y and B-Y (details of which will be described later). Also, the image processing unit 105 performs predetermined calculation processing using the captured image data. Based on the obtained calculation result, a system control unit 150 performs exposure control and distance measuring control. Thus, AF (Automatic Focus) processing, AE (Automatic Exposure) processing, and EF (flash pre-emission) processing of TTL (Through the Lens) type are performed. Furthermore, the image processing unit 105 performs predetermined calculation processing using the captured image data, and AWB (Automatic White Balance) processing of TTL type is performed on the basis of the obtained calculation results.

Data from the A/D converter 104 is directly written into an image memory 106 via both the image processing unit 105 and memory control unit 107 or via the memory control unit 107. The image memory 106 stores the image data which has been obtained from the image capturing unit 103 and converted into digital data by the A/D converter 104, and image data to be displayed on a display unit 109. The image memory 106 has a storage capacity that is sufficient for storing a predetermined number of still images as well as moving images and audio for a predetermined time period.

The image memory 106 also functions as a memory for image display (video memory). A D/A converter 108 converts the image display data stored in the image memory 106 into an analog signal and applies the display unit 109 with the analog signal. The image display data that was written into the image memory 106 is displayed by the display unit 109 via the D/A converter 108. The display unit 109 performs, on a display device such as an LCD, display in accordance with the analog signal from the D/A converter 108. A predetermined signal processing of the digital signal once converted by the A/D converter 104 and stored in the image memory 106 is performed by the image processing unit 105 and then stored in the image memory 106. In this manner, the digital signals stored in the image memory 106 are converted into analog signals, and the analog signals are successively transmitted to the display unit 109 so as to be displayed thereon, making it possible to realize an electronic view finder (EVF) functionality and to perform through-the lens image display (live view display).

A codec unit 110 performs compression-coding/decoding processing based on a standard such as MPEG for image data written into the image memory 106.

A color grading unit 113 performs color grading processing for image data which has been written into the image memory 106 from the image processing unit 105 based on a CDL set by the user via an operation unit 120. In the color grading processing, for example, color grading is performed for an image by 3D LUT processing or tone curve adjustment to obtain a texture intended by the user. Image data output from the color grading unit 113 is written into the image memory 106 via the memory control unit 107.

A recording medium I/F 112 is an interface which controls access to a recording medium 111. The recording medium 111 is a built-in and/or external memory card, HDD (Hard Disk Drive), or the like for recording shot image data and environment information (to be referred to as color grading information hereinafter) (to be described later).

The operation unit 120 includes operation members such as a power switch, shutter (recording start) button, and touch panel, and inputs various operation instructions to the system control unit 150.

By selecting various functional icons displayed on the display unit 109, appropriate functions for each situation are assigned to the operation units 120, and the operation units 120 thus act as various function buttons. Examples of these function buttons include an end button, a back button, an image scrolling button, a jump button, a narrow-down button, an attribute change button. For example, a notification for a menu switching instruction is given and a menu screen that enables various settings to be made is displayed on the display unit 109 by pressing a menu button. The user can make various settings intuitively by using the menu screen, which is displayed on the display unit 109, four-direction (up, down, left, right) buttons and a SET button.

A power supply unit 122 is constituted by, for example, a battery detection circuit, a DC-DC converter, a switch circuit for changing over the block to be supplied with power, and detects a battery has been inserted or not, the type of the battery, and the residual capacity thereof. Further, the power supply unit 122 controls the DC-DC converter in accordance with the detection results and an instruction of the system control unit 150, and supplies a necessary voltage for a necessary length of time to each of the units including the recording medium 111.

The power supply unit 122 comprises a primary battery such as an alkaline battery or a lithium battery, a secondary battery such as an NiCd battery, an NiMH battery, or an Li battery, or an AC adaptor.

A nonvolatile memory 123 is, for example, an EEPROM, which is electrically erasable and recordable. In the nonvolatile memory 123, constants and programs, for example, for operating the system control unit 150 are stored. In this context, "programs" may refer to programs for executing flowcharts that will be described later.

A communication unit 126 is an interface such as a USB interface for communicating with an external device. The external device is, for example, a printer, a personal computer (color grading apparatus), or another image capturing apparatus. The communication unit 126 can detect that an external device has been connected, and can notify the system control unit 150 of a detection signal. The communication unit 126 can also detect the type of connected external device and even disconnection (removal) of it from the connection state, and can notify the system control unit 150 of a detection signal. An external device may also be configured to perform control (for example, instruction of a CDL) of the color grading unit 113 via the communication unit 126.

The system control unit 150 realizes, by executing the programs stored in the nonvolatile memory 123, the procedures of the flowchart that will be described later.

A system memory 125 is, for example, a RAM and used also as a work memory where constants and variables for operating the system control unit 150, and the programs read out from the nonvolatile memory 123 are expanded. The system control unit 150 controls the image memory 106, the D/A converter 108, the display unit 109, and the like, so as to perform display control. A system timer 124 is a timer circuit for measuring time periods for various types of controls and the time of an integrated clock.

<Configuration of Image Processing Unit>

Next, the configuration and functions of the image processing unit according to the embodiment will be explained with reference to FIG. 2.

Figure 2:
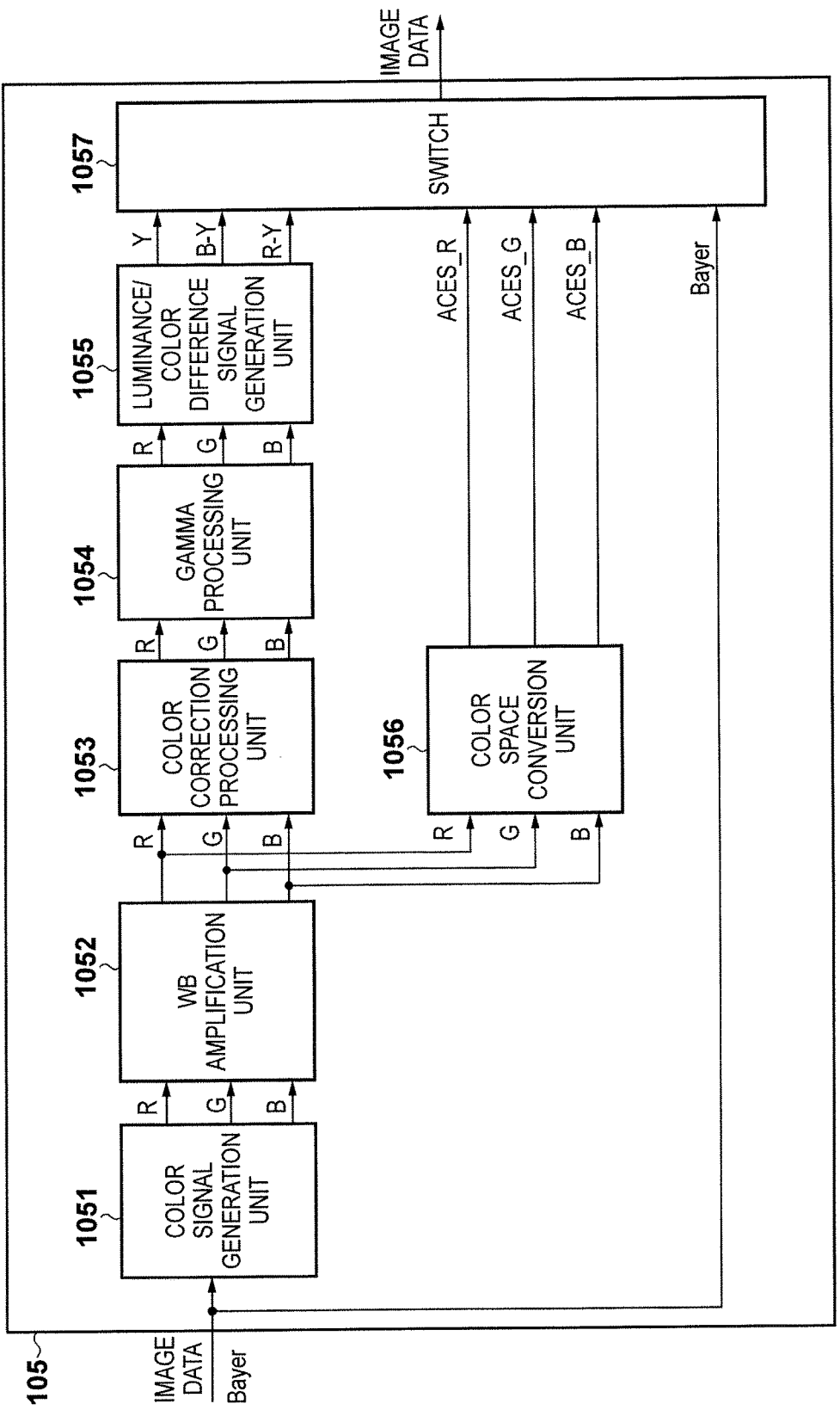
FIG. 2 is a block diagram showing the configuration of an image processing unit according to the first embodiment.

Referring to FIG. 2, the image processing unit 105 includes a color signal generation unit 1051, WB (White Balance) amplification unit 1052, color correction processing unit 1053, gamma processing unit 1054, luminance/color difference signal generation unit 1055, color space conversion unit 1056, and switch 1057.

Next, processing by the image processing unit 105 having the above configuration will be explained.

Image data input from the A/D converter 104 to the image processing unit 105 in FIG. 1 has a Bayer RGB RAW format, and a Bayer RGB signal is input to the color signal generation unit 1051.

The color signal generation unit 1051 performs synchronization processing for the input Bayer RGB image data to generate color signals R, G, and B. The color signal generation unit 1051 outputs the generated color signals R, G, and B to the WB amplification unit 1052.

The WB amplification unit 1052 multiplies the color signals R, G, and B by gains based on white balance gain values calculated by the system control unit 150, thereby adjusting the white balance.

The color correction processing unit 1053 performs 3×3 matrix processing and 3D LUT processing for the color signals R, G, and B, thereby correcting the color tone.

The gamma processing unit 1054 performs gamma correction to, for example, multiply a gamma complying with a standard such as Rec. 709 or a gamma of a log characteristic.

The luminance/color difference signal generation unit 1055 generates the luminance signal Y and color difference signals R-Y and B-Y from the R, G, and B signals, and outputs them to the image memory 106 via the memory control unit 107.

The WB amplification unit 1052 outputs an image having undergone white balance processing to the color space conversion unit 1056. The color space conversion unit 1056 converts the R, G, and B values of shot image data into R, G, and B values of a predetermined standard.

As reference R, G, and B signals, the embodiment adopts the ACES (Academy Color Encode Specification) standard proposed by the AMPAS (Academy of Motion Picture Arts and Sciences). That is, input R, G, and B signals are converted into signals in an ACES color space ACES_RGB. The ACES_R, ACES_G, and ACES_B signals have color reproduction characteristics faithful to an object. Conversion into ACES_R, ACES_G, and ACES_B signals can be achieved by performing 3×3 matrix calculation for R, G, and B signals.

The system control unit 150 decides parameters for color reproduction correction processing by referring to information serving as factors of a change of the color balance, such as the light source and the tint of the lens. For example, when optical information is used, parameters for color reproduction based on the ACES standard are prepared in advance for respective light sources such as daylight and the A light source. The system control unit 150 selects color correction parameters corresponding to optical information, and outputs them to the color space conversion unit 1056. The color space conversion unit 1056 performs color reproduction correction processing based on the color correction parameters, and outputs the converted ACES_R, ACES_G, and ACES_B signals.

The switch 1057 selects and outputs the Bayer RGB data, the ACES_R, ACES_G, and ACES_B signals, or the luminance signal Y and color difference signals R-Y and B-Y. The output image data is temporarily written in the image memory 106 and then recorded on the recording medium 111 via the recording medium I/F 112.

<Color Grading Processing>

Next, processing of performing color grading while shooting, and recording color grading information for each frame will be explained with reference to FIGS. 3 and 4.

Figure 3:
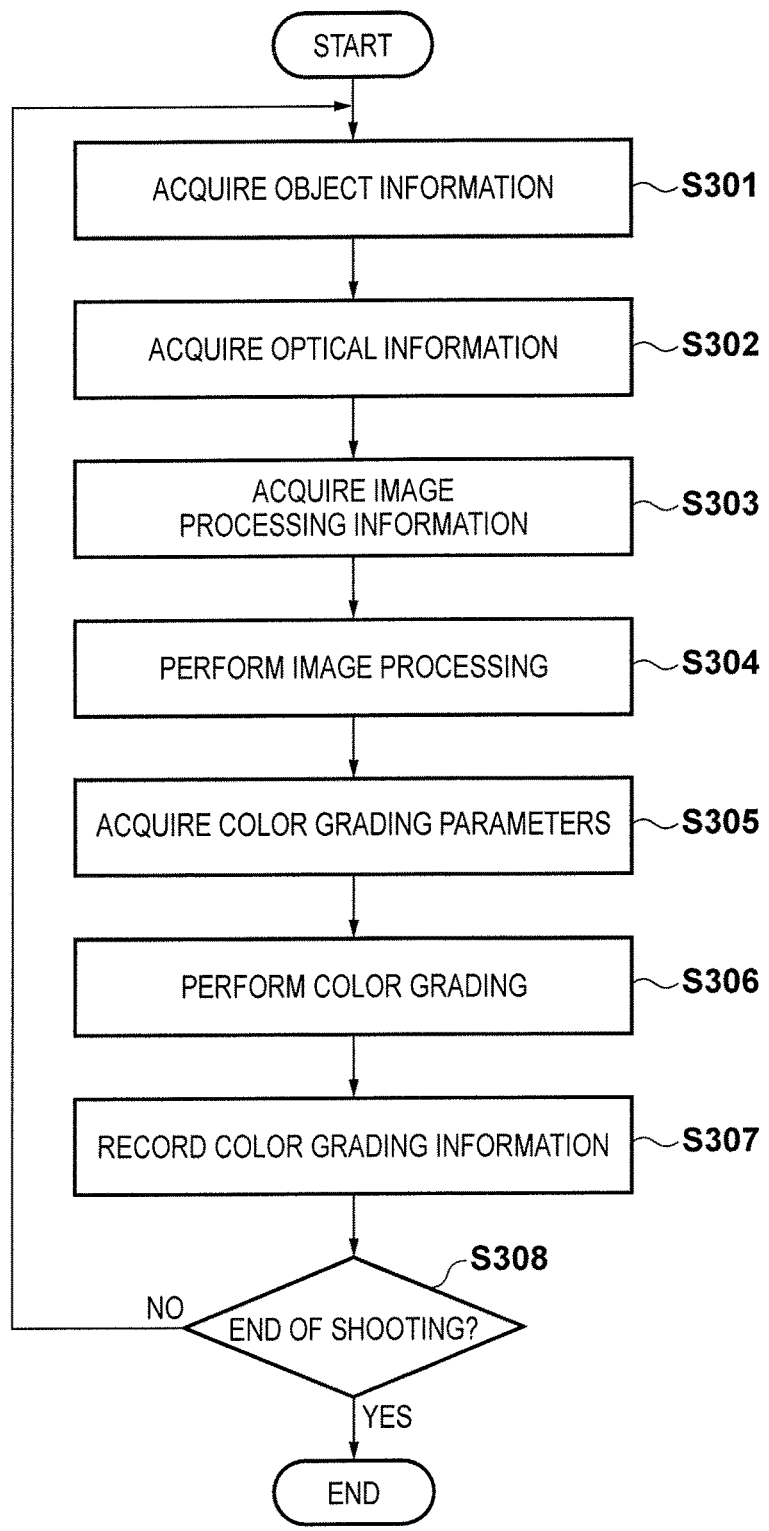
FIG. 3 is a flowchart showing recording processing for color grading information.

Note that the processing in FIG. 3 is realized by expanding, in the system memory 125, a program stored in the nonvolatile memory 123 and executing it by the system control unit 150.

In FIG. 3, when the user turns on a power switch 121, the image capturing apparatus 100 is activated so that color grading can be performed.

In step S301, the system control unit 150 acquires object information. This object information is information about a shot object, including information of a light source which irradiates an object, the pixel value of an object having a predetermined reflectance, and the contrast of an object. The object information is information which influences the tint and tone characteristic of a shot image. The system control unit 150 analyzes image data held in the image memory 106 to acquire object information. For example, for the color temperature, the system control unit 150 acquires the color temperature of the light source that has been calculated by light source estimation performed by image analysis in the image processing unit 105.

Although not shown in FIG. 1, object information may be acquired by measurement using a dedicated sensor. For example, the numerical value of a color thermometer or exposure meter may be acquired. As the acquisition method, the numerical value of the color thermometer or exposure meter may be input by the user to the image capturing apparatus 100 via the operation unit 120, or may be acquired by data communication between the color thermometer or exposure meter and the communication unit 126.

In step S302, the system control unit 150 acquires optical information. This optical information is information about the optical system of the image capturing apparatus 100, including the model name, tint, and MTF (resolution and contrast) of a lens, and a color filter. The optical information is information which influences the tint and tone characteristic of a shot image.

In step S303, the system control unit 150 acquires image processing information. This image processing information is information representing image processing to be performed by the image processing unit 105. The image processing information is information which influences the tint and tone characteristic of a shot image. For example, the image processing information represents the following image processing contents and their parameters:

white balance adjustment processing and gain values for the R, G, and B signals in the WB amplification unit 1052 color tone correction processing and the coefficients of a 3×3 matrix in the color correction processing unit 1053 gamma correction processing and gamma curve characteristic values in the gamma processing unit 1054 color space conversion processing and color correction parameters in the color space conversion unit 1056 types of image data output from the image processing unit 105 (luminance and color differences, ACES_R, ACES_G, and ACES_B, or Bayer RGB)

In step S304, the image processing unit 105 performs various image processes for image data output from the A/D converter 104 based on image processing parameters output from the system control unit 150.

In step S305, the system control unit 150 acquires a CDL set from the user or an external device via the operation unit 120 or communication unit 126. The CDL includes, for example, parameters representing the coefficients of 3D LUT processing to be performed by the color grading unit 113, and the characteristic of a tone curve.

In step S306, based on the CDL set in step S305, the color grading unit 113 performs color grading for image data which has been output from the image processing unit 105 and held in the image memory 106. Image data which has been output from the image processing unit 105 and held in the image memory 106 is image data selected by the switch 1057 from the Bayer RGB data, the ACES_R, ACES_G, and ACES_B signals, or the luminance signal Y and color difference signals R-Y and B-Y. The display unit 109 displays the image data having undergone color grading in this manner. While confirming the image which has undergone color grading and is displayed on the display unit 109, the user can set again the CDL so as to bring the image close to a desired texture.

Figure 4:
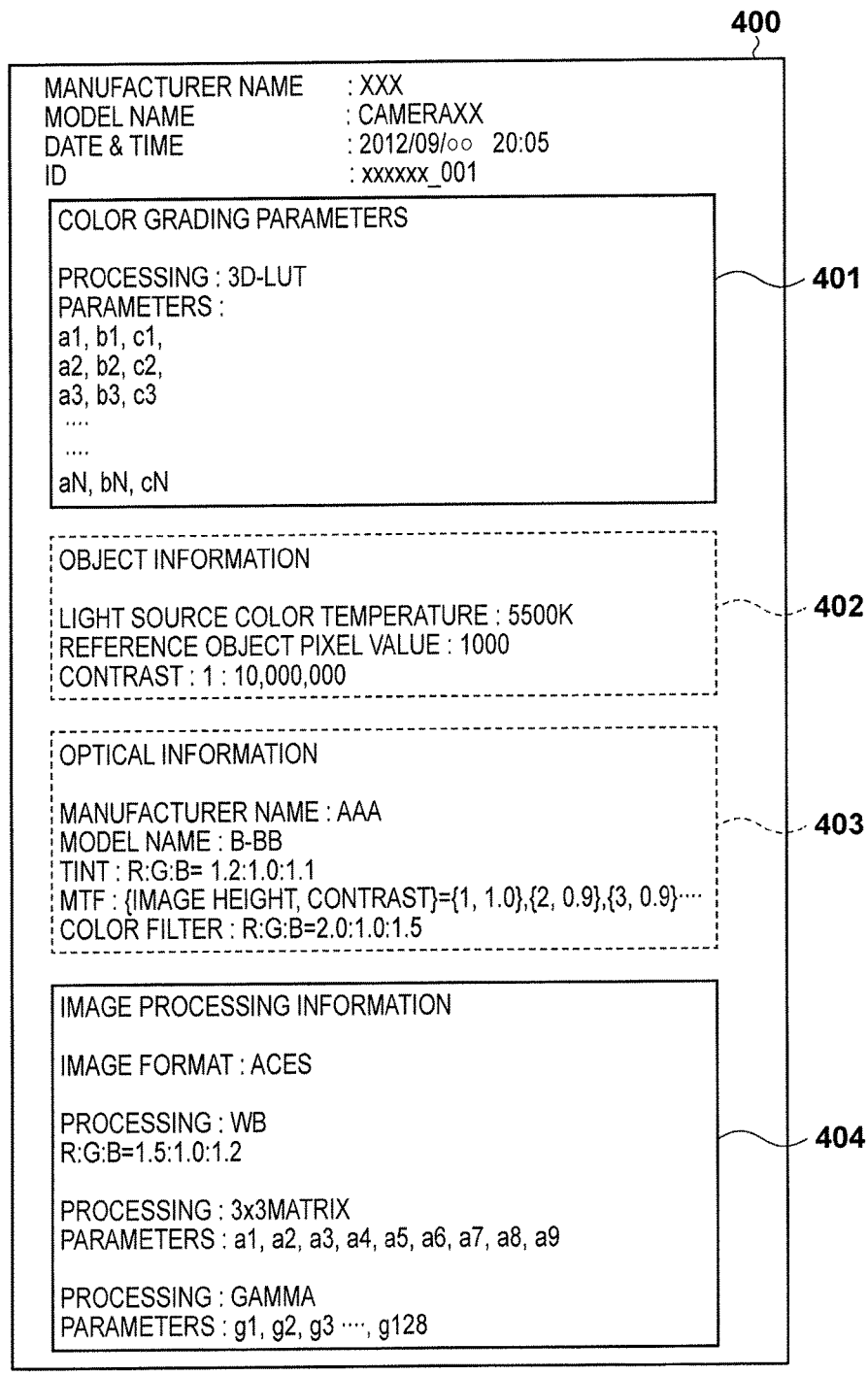
FIG. 4 is a view exemplifying the data structure of color grading information.

In step S307, the system control unit 150 records color grading information 400 as shown in FIG. 4 on the recording medium 111. The color grading information 400 is meta-information as shown in FIG. 4, and includes information associated with at least one of a CDL 401, object information 402, optical information 403, and image processing information 404. These pieces of information are those acquired by the system control unit 150 in steps S301, S302, S303, and S305. Here, a parameter is a variable such as a matrix which is applied to image data to adjust the color and tone of the image data. Note that the light source color temperature included in the object information 402 shown in FIG. 4 serves as reference environment information for determining whether to directly apply the CDL to color grading of an image. In the embodiment, for example, the range of this light source color temperature ±500 K (5000 to 6000 K) is defined as a predetermined range. When the environment color temperature or object color temperature in shooting falls within this predetermined range, the CDL can be directly applied. Alternatively, the predetermined range may be set using the light source color temperature itself as the threshold.

In step S308, the processes in steps S301 to S307 are repeated for each frame of a moving image till the end of shooting.

As a result, color grading information by the number of frames is recorded on the recording medium 111.

When color grading information is recorded on the recording medium 111 for each frame of a moving image, as described above, a large amount of information is recorded, and subsequent handling of color grading information is considered to be cumbersome. To avoid this, it is desirable to finally record only effective color grading information. Processing of recording effective color grading information will be explained below.

In this example, processing of performing color grading while shooting, and recording color grading information for each frame has been described. To the contrary, it is also possible to record a CDL set in color grading after shooting, as in playback of an image, in association with object information, optical information, image processing information, and the like.

Figure 5:
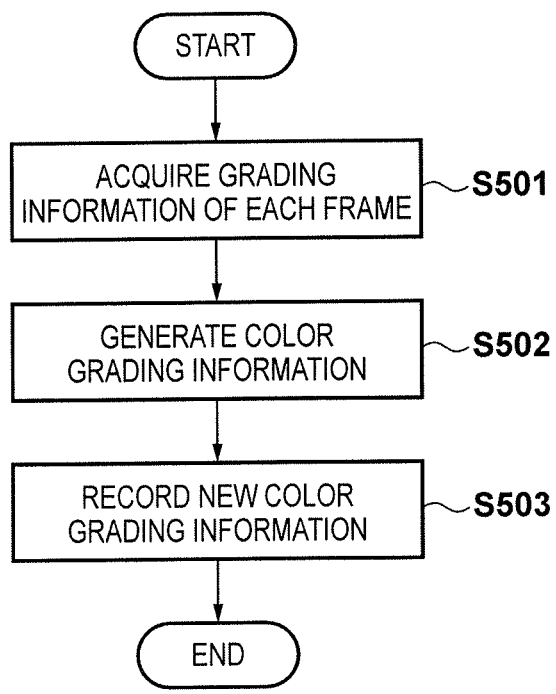
FIG. 5 is a flowchart showing processing of newly recording color grading information.

FIG. 5 shows processing of newly generating effective color grading information based on color grading information recorded for each frame of a moving image, and recording the effective color grading information. Note that the processing in FIG. 5 is realized by expanding, in the system memory 125, a program stored in the nonvolatile memory 123 and executing it by the system control unit 150.

In step S501 of FIG. 5, the system control unit 150 acquires color grading information of each frame that is recorded on the recording medium 111. This color grading information is recorded on the recording medium 111 by the processing of FIG. 3.

In step S502, the system control unit 150 extracts and processes effective color grading information based on the color grading information of each frame, generating new color grading information. Generation of the new color grading information will be explained with reference to FIG. 6.

Figure 6:
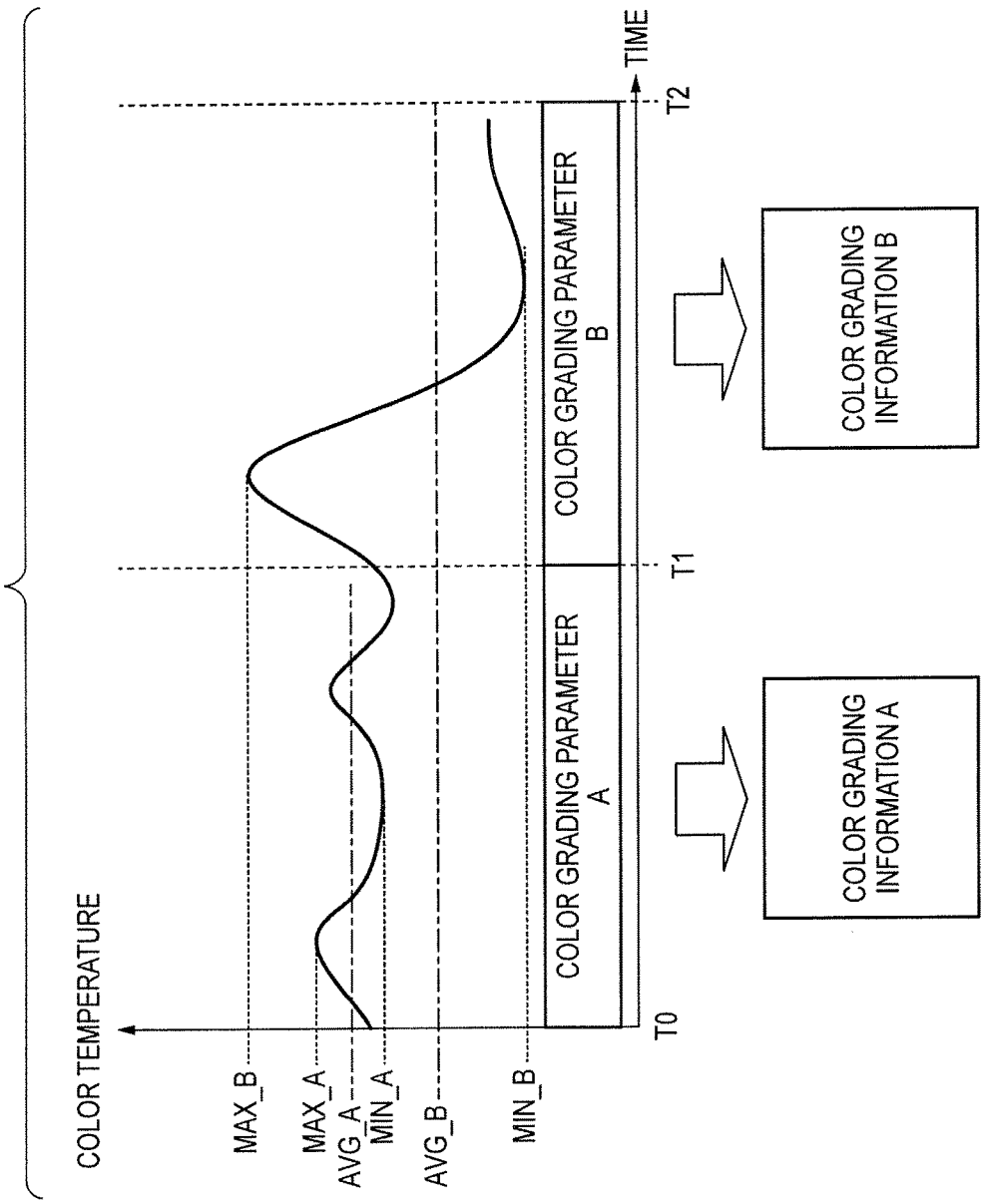
FIG. 6 is a view for explaining a method of newly generating color grading information.

FIG. 6 shows a temporal change of color grading information (color temperature and CDL) of each frame in a given cut. In the example of FIG. 6, the color temperature of an object changes over time. Parameter A is always described in the color grading information in a period between T0 and T1, and parameter B is always described in a period between T1 and T2.

New color grading information is generated for each CDL described above. This is because the CDL is a most important element in order to quickly bring an image close to a desired texture by subsequent processing using color grading information. In the example of FIG. 6, there are two CDLs, and color grading information is newly generated for each of the CDL at time T0 and the CDL at time T1 upon a change of the CDL.

It is considered that it takes time to perform color grading and bring an image close to a desired texture because trial-and-error is repeated. A CDL during trial-and-error is not a finally decided parameter and is ineffective. It is therefore desired to newly generate a finally decided CDL as color grading information. To realize this, only when the CDL has not changed for a predetermined period or more, color grading information may be newly generated.

Next, object information, optical information, and image processing information described in color grading information newly generated in the above-described way will be explained by exemplifying the color temperature of object information.

In FIG. 6, the system control unit 150 calculates the average value, maximum value, and minimum value of the color temperature in each frame in each of the period between T0 and T1 and the period between T1 and T2 in each of which the CDL does not change. As color temperature information, an average value AVG_A, maximum value MAX_A, and minimum value MIN_A are described in color grading information A. Also, as color temperature information, an average value AVG_B, maximum value MAX_B, and minimum value MIN_B are described in color grading information B.

Referring back to FIG. 5, in step S503, the system control unit 150 records the color grading information newly generated in step S502 on the recording medium 111 via the recording medium I/F 112.

When new color grading information is recorded, color grading information of each frame may be deleted.

The thus-recorded color grading information is used later as reference information for bringing an image close to a desired texture when performing color grading. More specifically, the user generates in advance color grading information for reproducing a plurality of textures such as a warm color system and cold color system. When performing color grading, the user can quickly bring an image close to a desired texture by using the color grading information generated in advance.

However, even if color grading is performed using color grading information generated in advance, a texture assumed from the color grading information may not be obtained. This is because, for example, even when obtaining the same cold color texture, the correction amount in color correction processing differs between a case in which a warm color scene having a low color temperature of the light source is changed into a desired cold color texture, and a case in which a cold color scene originally having a high color temperature of the light source is changed into a desired cold color texture. That is, color grading information suited to a processing target image to undergo color grading needs to be selected.

Next, an example in which the image capturing apparatus 100 acquires color grading information generated in advance and performs color grading will be explained with reference to FIG. 7.

Figure 7:
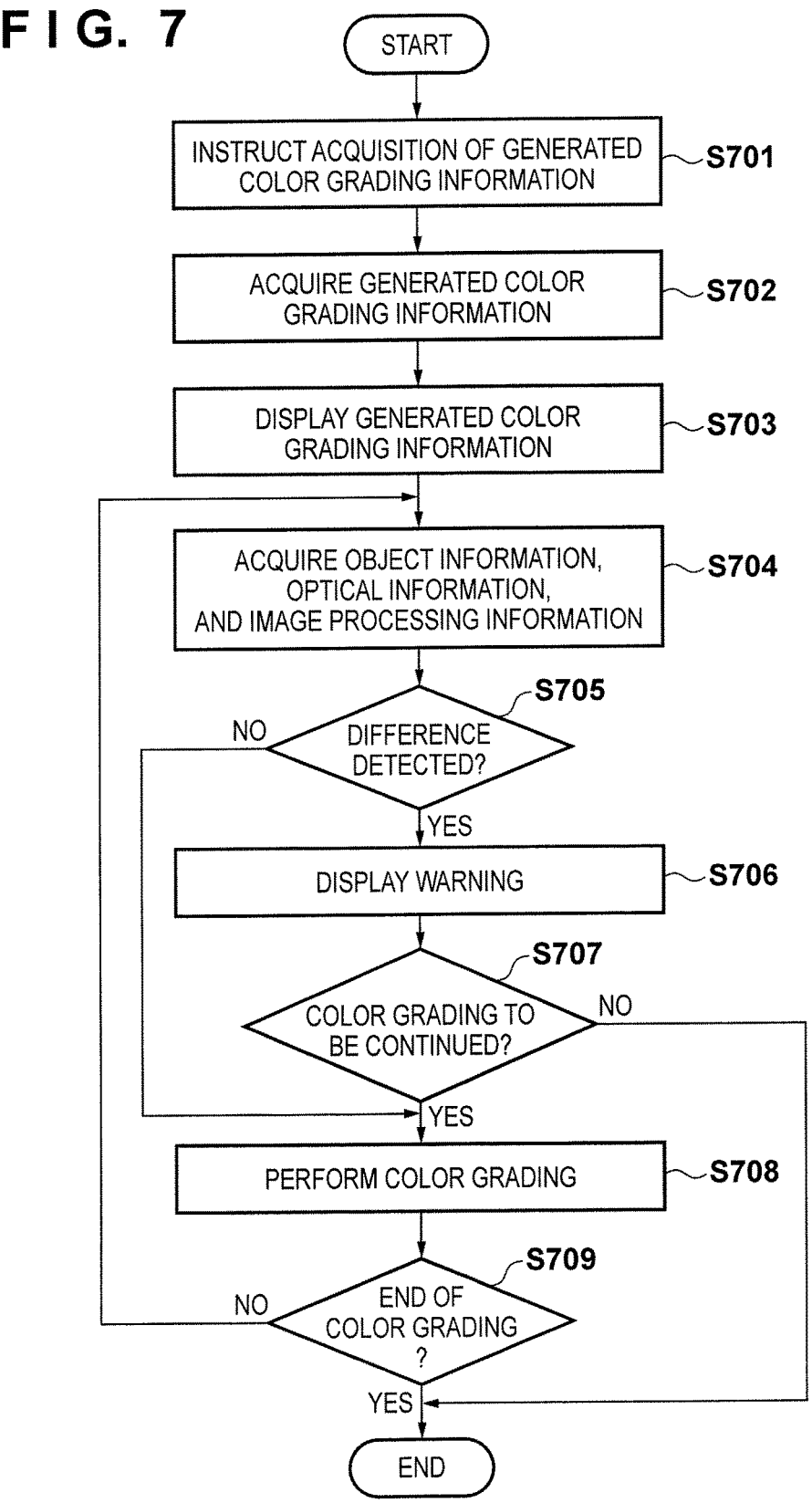
FIG. 7 is a flowchart showing color grading processing according to the embodiment.

When the user instructs the image capturing apparatus 100 via the operation unit 120 to acquire generated color grading information (step S701), the processing in FIG. 7 starts.

In step S702, the system control unit 150 acquires the instructed generated color grading information via the communication unit 126.

In step S703, the system control unit 150 displays the generated color grading information on the display unit 109. At this time, the user confirms the displayed generated color grading information, and if the user determines that this color grading information is not suitable for an image to undergo color grading, the user may instruct the image capturing apparatus 100 again in step S701 to acquire another generated color grading information.

In step S704, by using the processing of FIG. 3, the system control unit 150 acquires object information, optical information, and image processing information as environment information upon shooting the current processing target image.

In step S705, the system control unit 150 detects the difference between object information, optical information, and image processing information described in the color grading information acquired in step S703, and the object information, optical information, and image processing information acquired in step S704. This is because, when there is a difference between these pieces of information, even if color grading is performed using a CDL described in the generated color grading information, a desired texture may not be obtained. It may also be determined whether the detected difference falls within a predetermined range.

If a difference is detected in step S705, the process advances to step S706, and the system control unit 150 displays a warning as shown in FIG. 8 on the display unit 109. The example of FIG. 8 is a display which notifies the user that the color temperature described in the object information acquired in step S704 is 3,000 K, the color temperature described in the generated color grading information is 5,500 K, and there is a difference between them. The user confirms this warning display, and selects whether to continue or stop color grading.

In step S707, the system control unit 150 receives the instruction from the user via the operation unit 120 to continue or stop color grading. If the instruction by the user is "continue", the color grading unit 113 performs color grading based on the CDL described in the generated color grading information in step S708. If the instruction by the user is "stop", the process ends without performing color grading.

If no difference is detected in step S705, the color grading unit 113 performs color grading based on the CDL described in the generated color grading information in step S708 without displaying a warning.

In step S709, the processes in steps S704 to S708 are repeated until color grading ends.

In the processing of step S705, if the difference in object information, optical information, or image processing information is smaller than a predetermined threshold or falls within a predetermined range, it may not be detected as a difference.

The difference detection method in step S705 will be described by exemplifying the color temperature. When generated color grading information describes the maximum and minimum values of the color temperature, and the color temperature of object information of an image during shooting falls within the range of the maximum value to the minimum value, no difference is detected. Hence, only a large difference which influences the texture of an image having undergone color grading can be detected to display a warning.

Second Embodiment

Next, the second embodiment will be explained.

In the embodiment, an image capturing apparatus 200 and color grading apparatus 300 are connected to be able to communicate with each other. The image capturing apparatus 200 records image data and its environment information while image shooting. The color grading apparatus 300 acquires the shot image data and the environment information upon shooting from the image capturing apparatus 200, performs color grading, and records a CDL and the environment information upon shooting in association with each other.

The configurations of the image capturing apparatus 200 and color grading apparatus 300 according to the embodiment will be described with reference to FIG. 9. The same reference numerals as those in FIG. 1 according to the first embodiment denote the same components, and a description thereof will not be repeated.

First, the configuration of the image capturing apparatus 200 will be explained.

Figure 9:
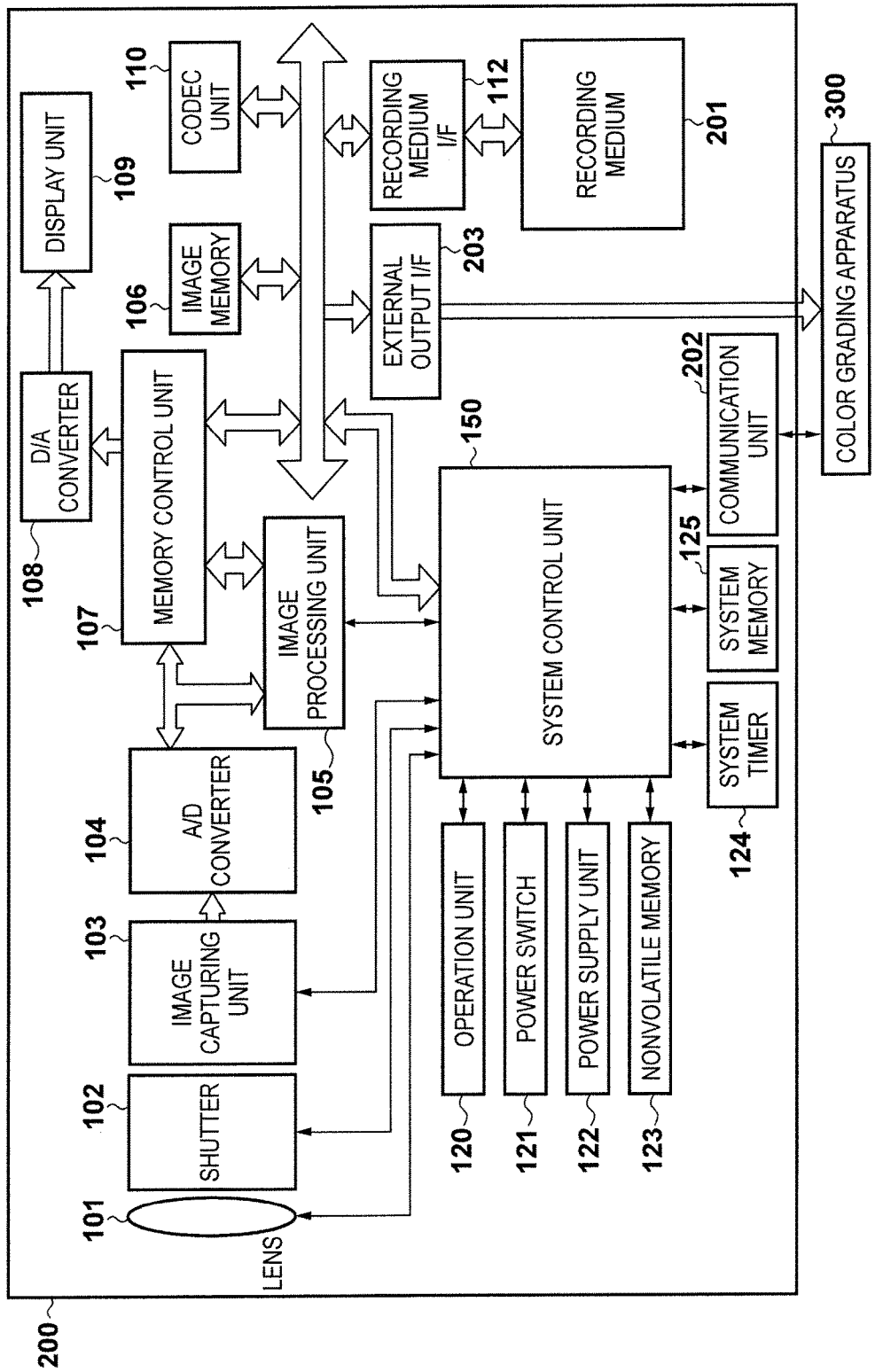
FIG. 9 is a block diagram showing a system configuration according to the second embodiment.

Referring to FIG. 9, a recording medium 201 is a memory card, hard disk, or the like, and records image data and environment information upon shooting. A communication unit 202 is an interface unit which communicates with the color grading apparatus 300. An external output I/F 203 is an interface unit which outputs image data and environment information upon shooting to the color grading apparatus 300. The remaining configuration is the same as that in FIG. 1.

Next, the configuration and functions of the color grading apparatus 300 will be explained with reference to FIG. 10.

The color grading apparatus 300 acquires, via the communication unit 202, image data and environment information upon shooting that are recorded on the recording medium 201, and performs color grading. The color grading apparatus 300 associates object information, optical information, and image processing information with a CDL, and records them as color grading information.

Figure 10:
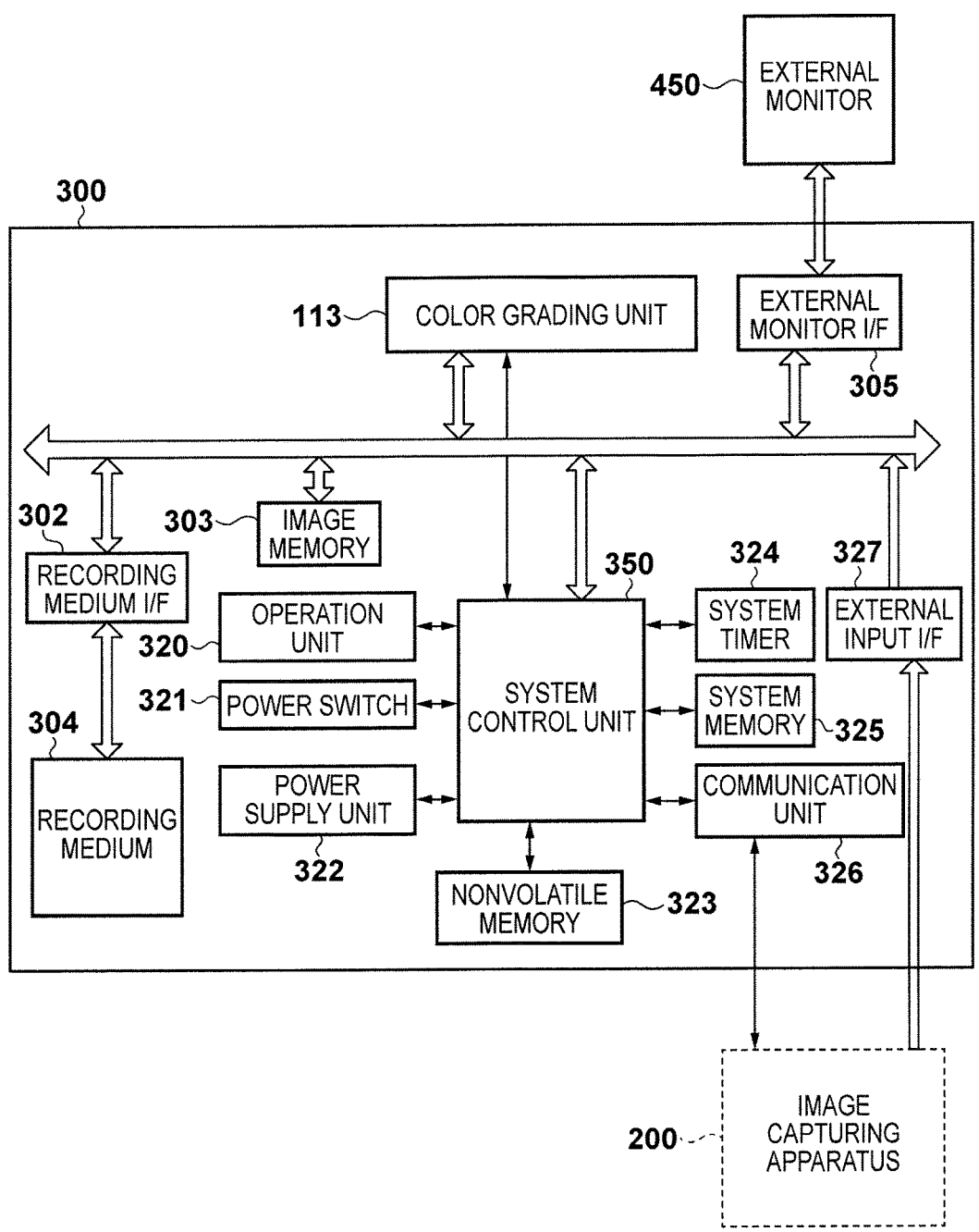
FIG. 10 is a block diagram showing the configuration of a color grading apparatus according to the second embodiment.

Referring to FIG. 10, the color grading apparatus 300 is connected to the image capturing apparatus 200 and an external monitor 450.

An external monitor I/F 305 is an interface unit which controls an output to the external monitor 450. A communication unit 326 is an interface unit which communicates with the image capturing apparatus 200. An external input I/F 327 is an interface unit which acquires image data and environment information upon shooting from the image capturing apparatus 200. The remaining configuration is the same as that of a block having the same name in FIG. 1, and a description thereof will not be repeated.

Next, a basic operation in the color grading apparatus 300 having the above-described configuration will be explained. Here, an example in which color grading is performed for image data input from the image capturing apparatus 200 via the external input I/F 327 will be explained.

A system control unit 350 stores, in an image memory 303, image data input from the image capturing apparatus 200 via the external input I/F 327.

The system control unit 350 acquires a CDL in accordance with a user operation via an operation unit 320, and outputs it to a color grading unit 113. The color grading unit 113 performs color grading according to the set CDL, and stores the image data having undergone color grading in the image memory 303. The system control unit 350 reads out the image data having undergone color grading from the image memory 303, and outputs it to the external monitor 450 via the external monitor I/F 305.

Processing of recording image data and environment information upon shooting by the image capturing apparatus 200 while shooting will be explained with reference to FIG. 11.

Figure 11:
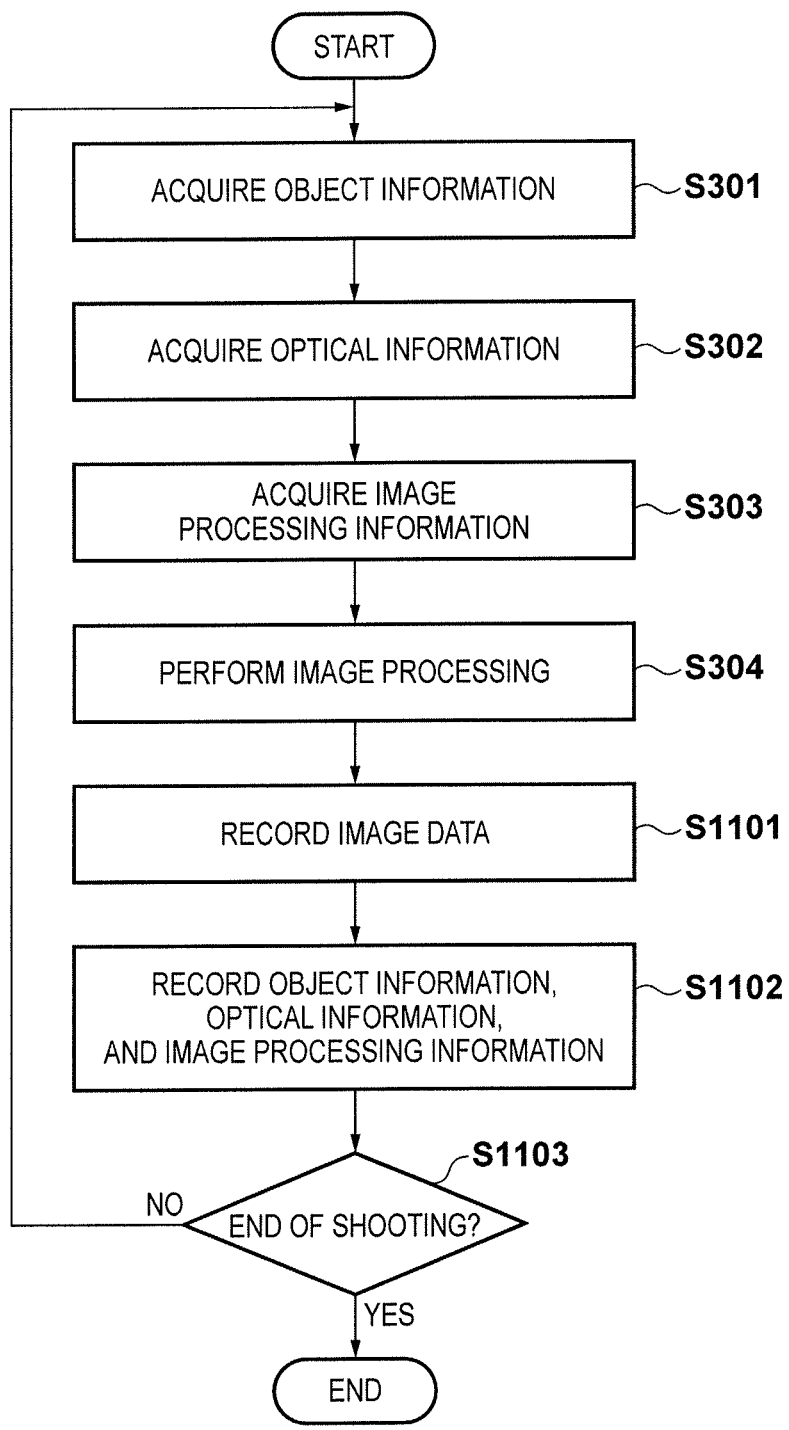
FIG. 11 is a flowchart showing recording processing for color grading information according to the second embodiment.

Note that the processing in FIG. 11 is realized by expanding, in the system memory 125, a program stored in the nonvolatile memory 123 and executing it by the system control unit 150.

In FIG. 11, when the user turns on the power switch 121 via the operation unit 120, the image capturing apparatus 200 is activated so that shooting can be performed.

Note that processes in steps S301 to S304 are the same as those in FIG. 3 according to the first embodiment, and a description thereof will not be repeated.

In step S1101, the system control unit 150 records, on the recording medium 201 via the recording medium I/F 112, image data which has undergone image processing and has been output from the image processing unit 105.

In step S1102, the system control unit 150 records, as environment information upon shooting on the recording medium 201 via the recording medium I/F 112, object information, optical information, and image processing information acquired in steps S301 to S303. The object information, optical information, and image processing information are recorded in association with the image data recorded in step S1101.

In step S1103, the processes in steps S301 to S304, S1101, and S1102 are repeated for each frame of the image till the end of shooting.

Next, processing of acquiring image data and environment information upon shooting by the color grading apparatus 300 from the image capturing apparatus 200, performing color grading, and recording color grading information will be explained with reference to FIG. 12.

Figure 12:
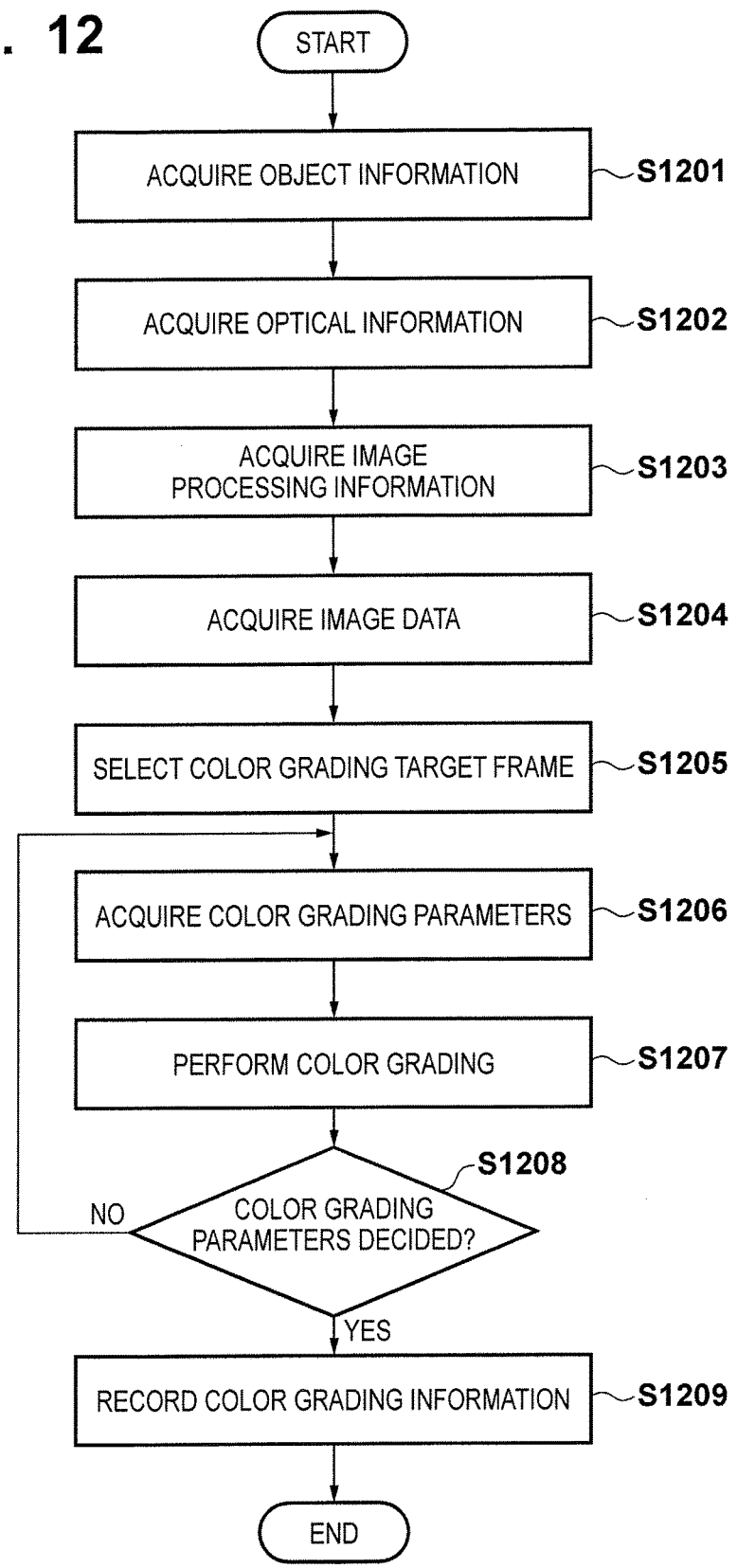
FIG. 12 is a flowchart showing color grading processing according to the second embodiment.

Note that the processing in FIG. 12 is realized by expanding, in the system memory 325, a program stored in the non-volatile memory 323 and executing it by the system control unit 350.

In FIG. 12, when the user turns on the power switch 321 via the operation unit 320, the color grading apparatus 300 is activated so that color grading can be performed.

In steps S1201 to S1203, the system control unit 350 acquires object information, optical information, and image processing information recorded on the recording medium 201 of the image capturing apparatus 200 via the external input I/F 327.

In step S1204, the system control unit 350 acquires image data recorded on the recording medium 201 of the image capturing apparatus 200 via the external input I/F 327.

In step S1205, the system control unit 350 selects image data of a frame to undergo color grading processing in accordance with a user operation via the operation unit 320.

In step S1206, the system control unit 350 acquires a CDL in accordance with a user operation via the operation unit 320. The CDL includes, for example, parameters representing the coefficients of 3D LUT processing to be performed by the color grading unit 113, and the characteristic of a tone curve.

In step S1207, based on the CDL, the color grading unit 113 performs color grading for image data acquired in step S1204. The system control unit 350 displays the image having undergone color grading on the external monitor 450. While confirming the image having undergone color grading processing that is displayed on the external monitor 450, the user can set again the CDL so as to bring the image close to a desired texture. If the image obtains the desired texture, the system control unit 350 acquires a color grading parameter decision instruction in accordance with a user operation via the operation unit 320 in step S1208.

In step S1209, the system control unit 350 records color grading information on a recording medium 304. The color grading information is meta-information as shown in FIG. 4, and is information associated with the CDL decided in step S1208, object information, optical information, and image processing information. These pieces of information are those acquired by the system control unit 350 in steps S1201 to S1203 and S1206.

If the image having undergone color grading does not attain the desired texture and no CDL is decided in step S1208, the processes in steps S1206 and S1207 are repetitively performed.

Although the color grading apparatus 300 is configured to acquire image data and environment information upon image shooting via the external output I/F 203 of the image capturing apparatus 200 in the embodiment, it may acquire them via the recording medium 201 of the image capturing apparatus 200. For example, when the recording medium 201 of the image capturing apparatus 200 is a memory card, the memory card is removed from the image capturing apparatus 200 and mounted as the recording medium 304 in the color grading apparatus 300. The system control unit 350 of the color grading apparatus 300 can then acquire image data and environment information via a recording medium I/F 302.

Note that the embodiment has explained color grading processing on the premise of the CDL which defines the methods of calculating the gain, gamma, and the like. However, the present invention is also applicable to color grading in which no calculation method is defined. When no color grading processing is defined, a color grading processing method is also recorded as color grading information. For example, the methods of calculating the gain, gamma, and the like are recorded.

Also, the embodiment has described the method of performing color grading uniformly on an entire image. However, color grading for each region may be performed so that color grading is performed for, for example, only the region of the sky. When color grading is performed for each region, a CDL for each region is recorded in association with environment information. As object information, for example, the type of object such as "sky" may be recorded.

In the embodiment, as color grading information, the CDL, object information, optical information, and image processing information are associated and recorded as one file. Alternatively, for example, the CDL, object information, optical information, and image processing information may be recorded as separate files, and a management file for managing a plurality of files may be generated to associate these files.

Third Embodiment

Next, the third embodiment will be explained.

In the third embodiment, processing of correcting a CDL generated and recorded by the image capturing apparatus 100 according to the above-described first embodiment or the color grading apparatus 300 according to the second embodiment is performed.

The apparatus configuration according to the third embodiment may be the image capturing apparatus 100 according to the first embodiment, or the configuration in which the image capturing apparatus 200 and color grading apparatus 300 according to the second embodiment are connected.

First, the configuration and functions of an image processing unit 105 according to the embodiment will be explained with reference to FIG. 13. The same reference numerals as those in FIG. 1 according to the first embodiment denote the same components, and a description thereof will not be repeated.

Figure 13:
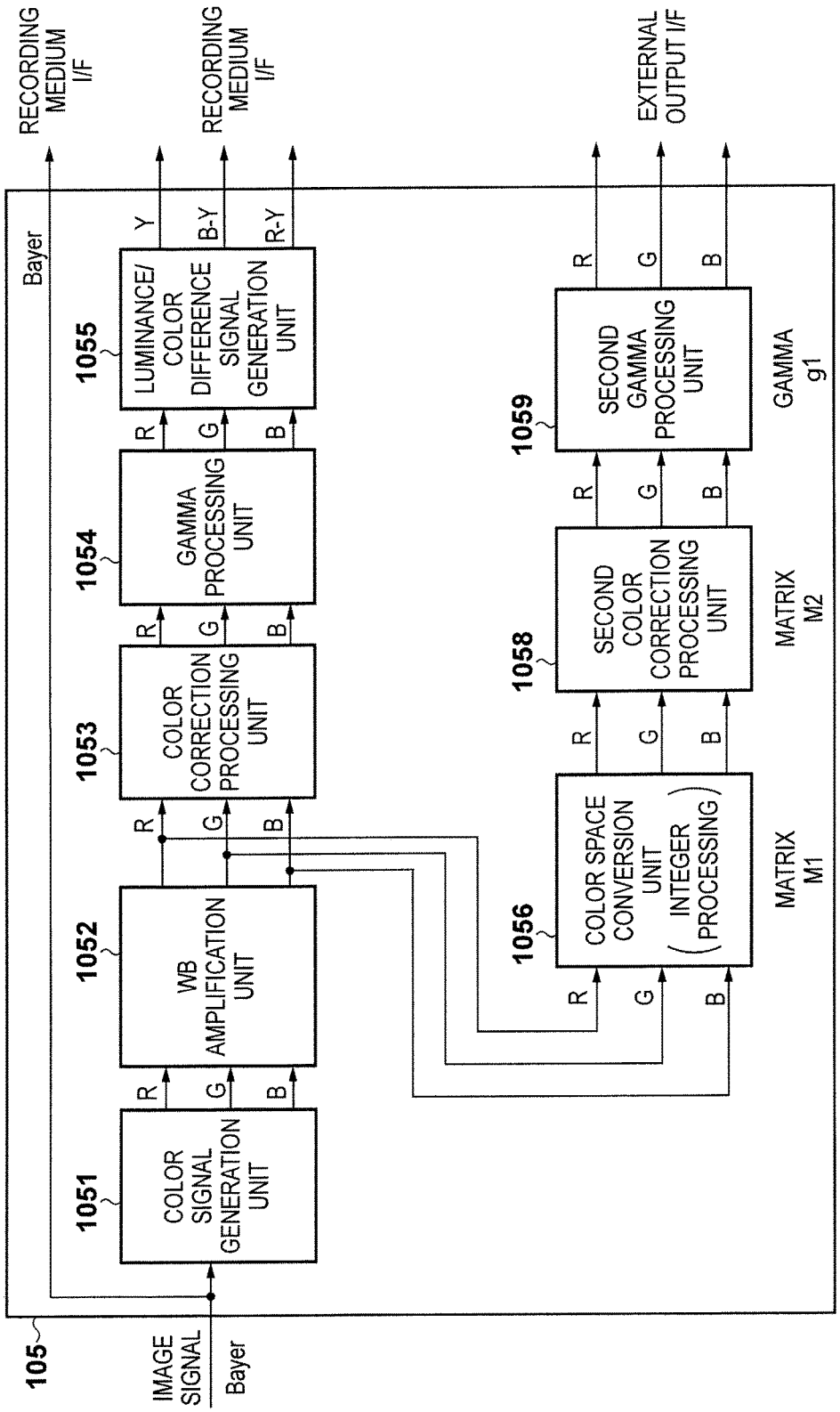
FIG. 13 is a block diagram showing the configuration of an image processing unit according to the third embodiment.

Referring to FIG. 13, the image processing unit 105 according to the third embodiment is different from the configuration in FIG. 2 according to the first embodiment in that the image processing unit 105 does not include the switch 1057, and a second color correction processing unit 1058 and second gamma processing unit 1059 are arranged at the subsequent stage of a color space conversion unit 1056. Remaining units, that is, a color signal generation unit 1051, WB amplification unit 1052, color correction processing unit 1053, gamma processing unit 1054, and luminance/color difference signal generation unit 1055 are the same as those described in the first embodiment with reference to FIG. 2.

The color space conversion unit 1056 converts R, G, and B signals into signals in the ACES color space proposed by the AMPAS (Academy of Motion Picture Arts and Sciences), and outputs the converted ACES_R, ACES_G, and ACES_B signals to the second color correction processing unit 1058. Conversion into the ACES color space can be achieved by performing 3×3 matrix calculation for R, G, and B signals. M1 represents this 3×3 matrix. Since the ACES color space is expressed by floating points, a value is multiplied by, for example, 1,000 and processed as an integer value.

The color space conversion unit 1056 outputs the converted ACES_R, ACES_G, and ACES_B signals to the second color correction processing unit 1058. The second color correction processing unit 1058 performs 3×3 matrix processing for the ACES_R, ACES_G, and ACES_B signals. M2 represents the 3×3 matrix to be multiplied by the second color correction processing unit 1058. The matrix M2 is decided by the contents of color grading processing. For example, a matrix manually set by the user or described in color grading information is realized. The second gamma processing unit 1059 performs gamma processing for R, G, and B signals in accordance with a set gamma parameter γ1, and outputs the image signals having undergone gamma processing to the external monitor 450 via the external monitor I/F 305. The characteristic of this gamma processing is also decided by a user operation or color grading information.

<CDL Correction Processing>

Next, processing of comparing environment information upon CDL generation with environment information upon image shooting by the system control unit 350 of the color grading apparatus 300 in FIG. 10, and correcting a CDL described in color grading information will be explained with reference to FIG. 14.

Figure 14:
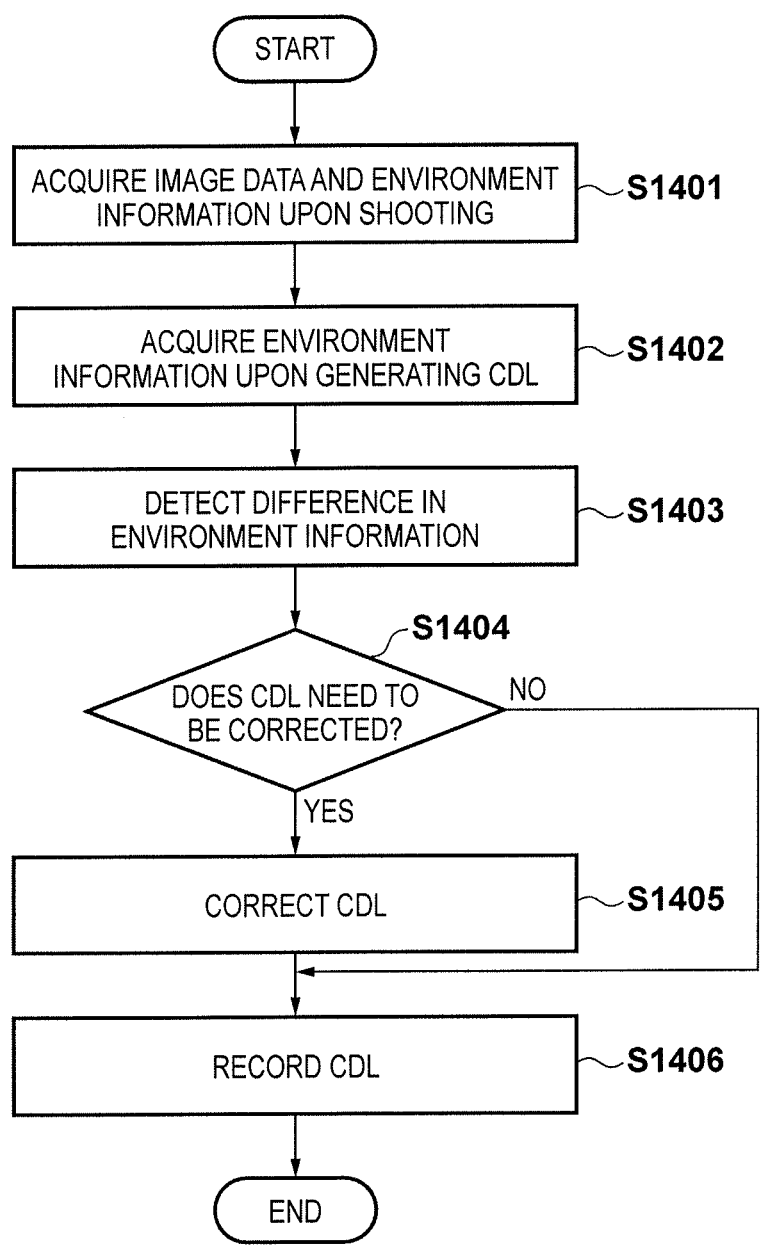
FIG. 14 is a flowchart showing parameter correction processing according to the third embodiment.

Note that the processing in FIG. 14 is realized by expanding, in the system memory 325, a program stored in the non-volatile memory 323 and executing it by the system control unit 350.

In step S1401 of FIG. 14, the system control unit 350 acquires image data and environment information upon shooting (to be referred to as shooting environment information hereinafter) from the recording medium 201 of an image capturing apparatus 200 via the recording medium I/F 112, and records them in the image memory 303. The shooting environment information includes object information 402, optical information 403, and image processing information 404 in FIG. 4.

In step S1402, similar to step S1401, the system control unit 350 acquires color grading information 400 and environment information upon generating color grading information (to be referred to as generation environment information hereinafter) which are recorded on the recording medium 201, and stores them in the image memory 303. The generation environment information serves as reference environment information for determining whether the CDL needs to be corrected.

In step S1403, the system control unit 350 detects the difference between the shooting environment information and the generation environment information. The environment information to be compared is roughly divided into three items: object information, optical information, and image processing information. More specifically, the object information includes the color temperature of a light source and the reference value of brightness. The optical information includes the tint and MTF of a lens, and a color filter. The image processing information includes gamma processing, color correction processing, and color space conversion processing.

In step S1404, if the difference between the shooting environment information and the generation environment information is detected, the system control unit 350 determines whether the CDL needs to be corrected for the current image data. Note that it may also be determined whether the detected difference falls within a predetermined range. Processing of comparing color temperatures of an object in pieces of object information to detect the difference between pieces of environment information, and determining whether the CDL needs to be corrected will be explained with reference to FIG. 15. First, color temperature information (5,500 K) described in the color grading information 400 is acquired from the object information 402 in FIG. 4. In the shooting environment information, the color temperature of the object is 5,600 K in FIG. 15A. In this case, it is determined in step S1403 that there is a difference between the color temperature described in the color grading information 400 and the color temperature of the object upon shooting.

In step S1404, therefore, the system control unit 350 determines whether the difference in environment information is at a level at which the CDL described in color grading information need not be corrected and can be permitted. For example, when attention is paid to the object information 402 in FIG. 4, a light source color temperature of 5,500 K (5,000 to 6,000 K) is described. This indicates that a CDL 401 described in the color grading information 400 can permit a change of the color temperature of the light source in the range of 5,000 to 6,000 K. A method of determining whether the difference in environment information is at a level at which the CDL 401 needs to be corrected will be described with reference to FIG. 15C.

Figure 15A:
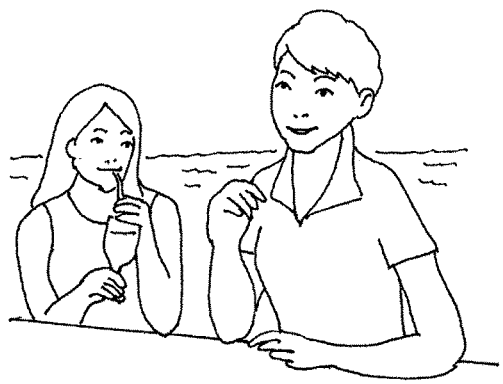
FIGS. 15A to 15C are views for explaining parameter correction processing according to the third embodiment.
Figure 15B:
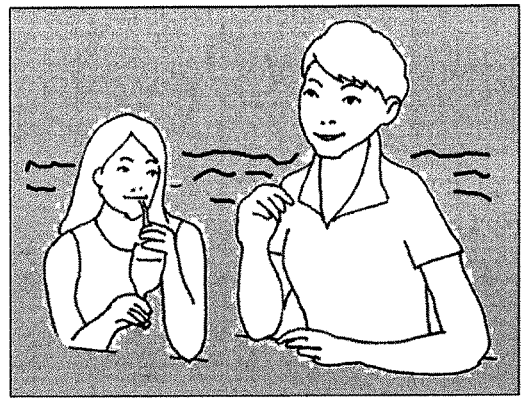
Figure 15C:
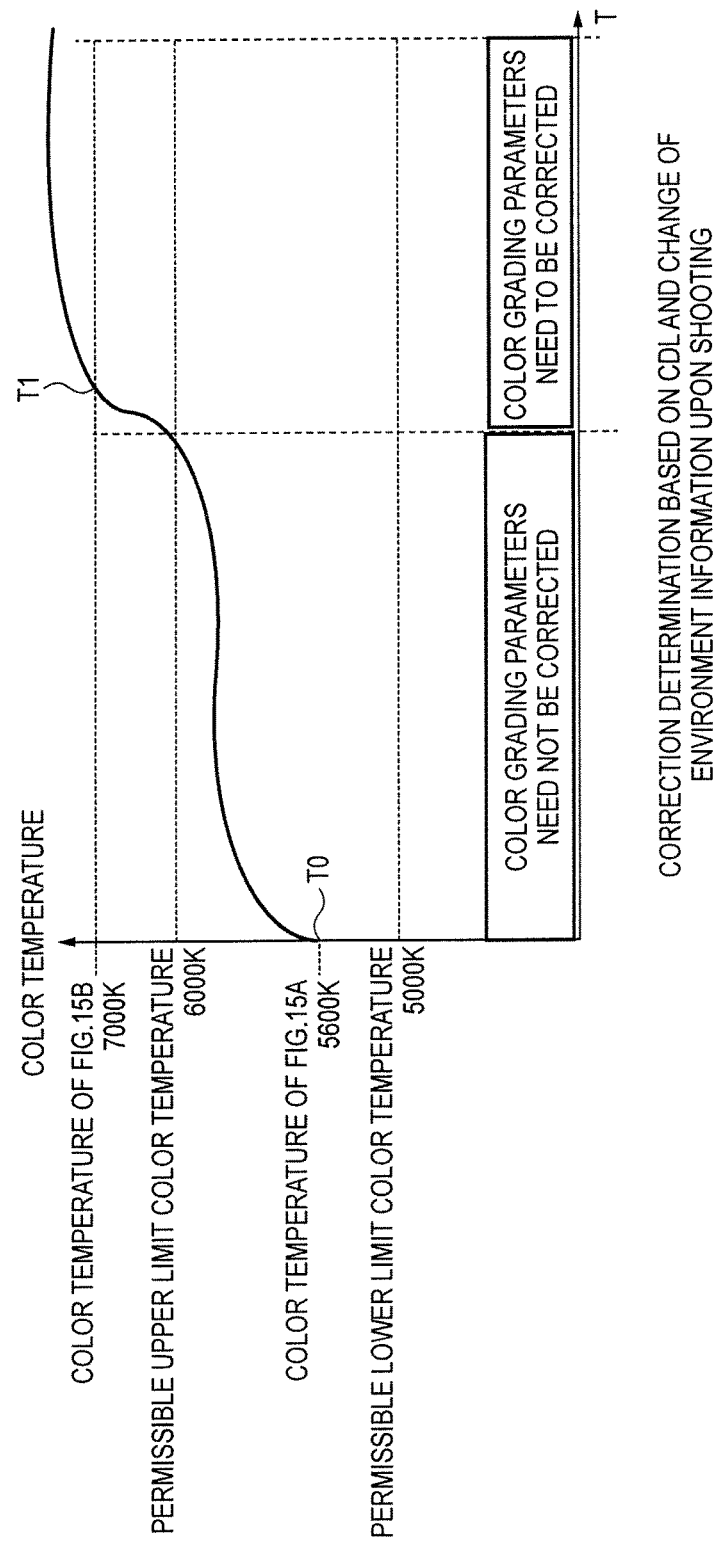

In FIG. 15C, the abscissa indicates the time of a frame at which image data to undergo color grading has been captured, and the ordinate indicates the light source color temperature of an object upon image shooting. The graph represents the light source color temperature, permissible upper limit color temperature, and permissible lower limit color temperature in the object information 402 of FIG. 4. As is apparent from FIG. 15C, the light source color temperature of the object changes for each shot frame. In FIG. 15A, the light source color temperature of the object is 5,600 K (T0 in FIG. 15C), and falls within the permissible limit color temperature range of 5,000 to 6,000 K.

Hence, as the determination result in step S1404, it is determined that the CDL 401 described in the color grading information 400 is at a level at which the difference in environment information does not influence the texture of an image, and that the CDL need not be corrected. If the image data is one in FIG. 15B, the color temperature of the object is 7,000 K and exceeds the permissible upper limit color temperature of 6,000 K from time T1 in FIG. 15C. When the color temperature described in the CDL exceeds the permissible color temperature range, even if color grading is performed using the CDL 401 described in the color grading information 400, a desired texture cannot be obtained. It is therefore determined that the CDL needs to be corrected, and the process advances to step S1405.

As a modification, if the CDL needs to be corrected based on the difference detected in step S1403, a message indicative of this may be displayed on a warning screen, or a warning screen representing the degree of influence of the difference in environment information on the texture of an image (for example, the degree of influence on tint or brightness) may be displayed.

In step S1405, since the system control unit 350 determines in step S1404 that the CDL needs to be corrected, it corrects the CDL 401 described in the color grading information 400. The CDL correction method can be realized by performing an existing image processing method. For example, a method of correcting the CDL by changing the WB value will be explained. Since the color temperature of the object in FIG. 15B is 7,000 K, the RGB coefficient ratio of the WB is changed and the CDL is corrected. This can be realized by correcting the CDL 401 to increase the weight of the R coefficient so that the color temperature of the object comes close to the light source color temperature of 5,500 K in the object information 402 of FIG. 4. At this time, a desired texture may not be obtained by only changing the WB coefficient. For example, assume that a CDL is set to enhance the texture of cloudiness, by using image data shot in a cloudy day. In this case, even if the WB coefficient of an image on a clear day is corrected to obtain the same desired tint, a desired texture cannot be obtained because the contrast, saturation, and the like of the object are different. To solve this problem, it is also possible to prepare in advance parameters for, for example, adjusting the saturation and contrast in accordance with the color temperature difference, and adjust the saturation and contrast simultaneously when the WB coefficient is corrected.

Finally, in step S1406, the system control unit 350 records the corrected CDL on the recording medium 304 by overwriting, with the corrected CDL, the CDL 401 described in the color grading information 400.

As described above, it is possible to determine whether the CDL described in the color grading information 400 needs to be corrected, and if necessary, correct the CDL.

The embodiment adopts the configuration in which whether to correct the CDL is determined by comparing shooting environment information with generation environment information to detect the difference. Thus, the load of color grading processing upon shooting can be reduced regardless of image data used when generating in advance color grading information, and environment information upon shooting an image to undergo color grading.

The embodiment has explained processing of correcting the CDL in accordance with the difference in light source color temperature. However, the present invention is not limited to this, and comparisons may be made for various kinds of environment information to correct the CDL. For example, it is also possible to compare correction of the pixel value of a reference object as environment information about object information, and the model name, tint, and MTF of a lens, and the like as optical information, and when the difference in environment information exceeds the permissible level, correct the CDL.

The embodiment has explained processing of overwriting an original CDL with a corrected CDL. However, the original CDL need not always be overwritten. For example, difference information between the original CDL described in color grading information and the corrected CDL may be additionally written. Alternatively, the corrected CDL may be recorded as a file separate from the original CDL.

If the CDL cannot be corrected in step S1405, a log may be displayed in regard to a parameter and difference information, which could not be corrected. A case in which the CDL cannot be corrected is, for example, a case in which the color spaces (YUV space and RGB space) of image data to undergo color grading and image data for generating color grading information are different, or gamma curves (Rec. 709 gamma and log gamma) are different.

The embodiment has explained processing of correcting the CDL based on the difference in environment information. However, when the contents of color grading processing are described, parameters described in the processing contents may be corrected. In this case, it suffices to determine whether there is a difference in the contents of color grading processing, and if there is a difference, correct the CDL in accordance with the CDL and environment information of image data to undergo color grading processing.

Fourth Embodiment

Next, the fourth embodiment will be explained.

In the embodiment, the CDL is corrected based on the difference between environment information about image processing information such as the color space of an image used to generate color grading information and the shape of a gamma curve, and environment information including image processing information of image data to undergo color grading.

In the fourth embodiment, the configuration of a color grading apparatus is the same as that in FIG. 10 according to the second embodiment.

An outline of the fourth embodiment will be explained with reference to FIG. 16.

Figure 16:
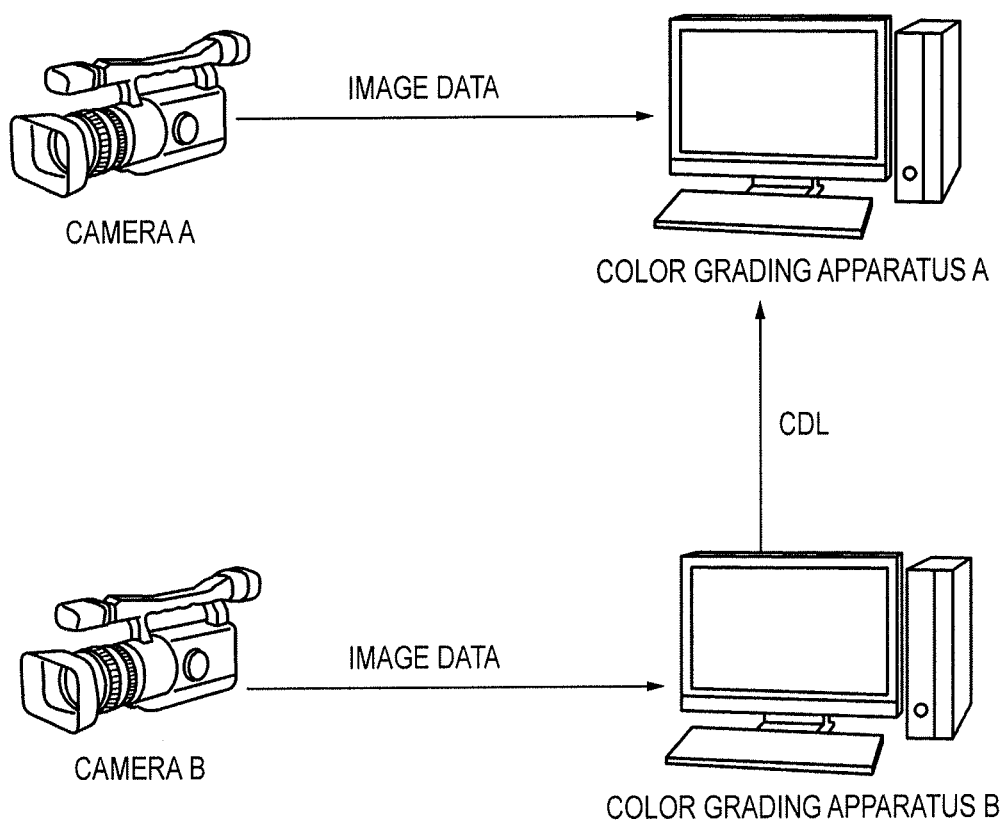
FIG. 16 is a view for explaining parameter correction processing according to the fourth embodiment.

In FIG. 16, image data to undergo color grading is image data captured by camera A. Second color grading apparatus B (configuration is the same as that in FIG. 10) generates color grading information by using image data captured by camera B, and transmits the generated color grading information to first color grading apparatus A. First color grading apparatus A performs color grading processing by using image data from camera A and second color grading information received from second color grading apparatus B.

In this case, since cameras are different, various format conversions occur when, for example, the format of image data transmitted from camera A and that of image data transmitted from camera B are different, or when the color space is converted during processing of generating color grading information by second color grading apparatus B. For example, while checking an image displayed on an external monitor 450, the user sets a matrix M2 and gamma γ1 via an operation unit 320 for image data received from camera B when second color grading apparatus B generates color grading information, so that the image comes close to a desired texture. If the color space of image data transmitted from camera B is changed when generating color grading information, a matrix M1 is also set. In this case, the operation unit 320 can directly accept input of the numerical values of the matrices M1 and M2 and gamma γ1, and can also display the matrix M2 and gamma γ1 prepared in advance and accept a selection operation by the user.

In this fashion, when generating color grading information by using second color grading apparatus B, the matrix M1 of color conversion to be performed by a color space conversion unit 1056 in FIG. 13, and the shape of the gamma γ1 of a second gamma processing unit 1059 may differ between image data of camera B when generating color grading information and image data of camera A.

In the embodiment, as for the difference between generation environment information serving as reference environment information, and shooting environment information, the difference in image processing information such as the color space of image data or the gamma in particular is detected to correct the CDL, thereby reducing the load of color grading processing.

Figure 17:
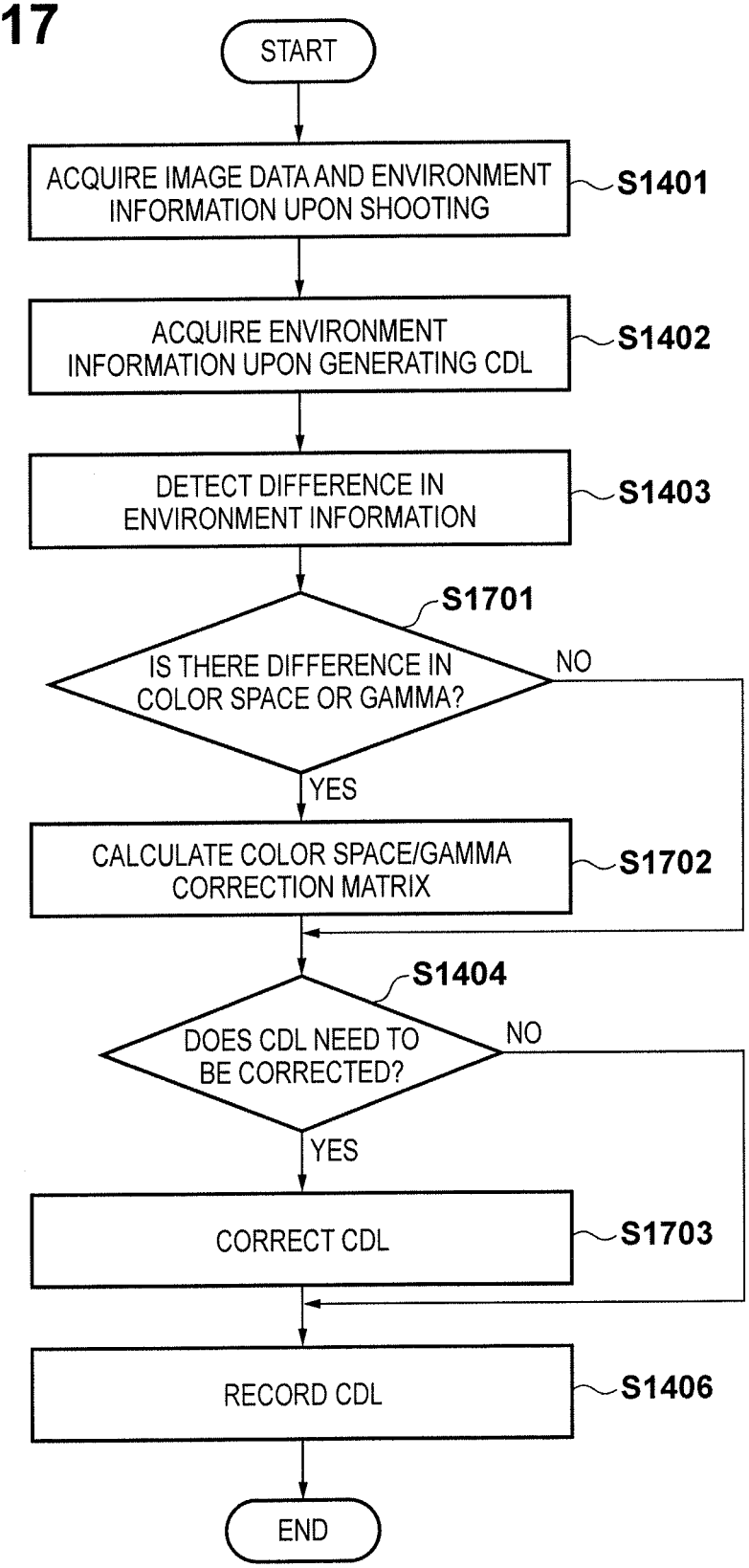
FIG. 17 is a flowchart showing parameter correction processing according to the fourth embodiment.

CDL correction processing according to the embodiment will be described with reference to FIG. 17. Processes in steps S1401 to S1404 and S1406 of FIG. 17 are the same as those in FIG. 14, and a description thereof will not be repeated.

In step S1701, the system control unit 350 determines whether there is a difference in one of gamma processing ($\gamma 1$ set value or gamma shape information), color correction processing (often expressed by a matrix included in the matrix M1), and color space conversion processing (matrix M1 or color conversion information), out of image processing information in which the difference has been detected in step S1403. This is because, when there is a difference in one of these processes, it is necessary to correct image processing information and then correct the CDL. If a difference is detected in the image processing information in step S1701, the process advances to step S1702; if no difference is detected, the same processing as that in step S1404 of FIG. 14 is performed.

In step S1702, the system control unit 350 calculates a matrix for correcting the difference especially in gamma processing or color space conversion processing out of the image processing information. For example, a case in which the gamma set value is different will be explained. In FIG. 16, $71a$ is the gamma value of image data (image data $\alpha$) captured by camera A, and $\gamma 1\beta$ is the gamma value of image data (image data $\beta$) captured by camera B. Even when color grading is performed using the same CDL (matrix M2) for image data having different gamma set values, the image data cannot attain a desired texture. To solve this problem, it suffices to make the gamma set value of image data $\beta$ coincide with that of image data $\alpha$ and then multiply the image data $\alpha$ and $\beta$ by the same CDL. That is, a matrix Z which gives $\gamma 1\alpha = Z \times \gamma 1\beta$ is calculated. Similarly, even when color space processing is different, it suffices to calculate the matrix Z which makes the color spaces of image data $\alpha$ and image data $\beta$ coincide with each other.

After that, in step S1404, whether the CDL needs to be corrected is determined based on the difference in environment information that has been detected in step S1403. If the CDL needs to be corrected, the process advances to processing in step S1703.

In step S1703, the system control unit 350 corrects the CDL similarly to step S1405 of FIG. 14. When that the matrix Y represents the correction amount of the CDL, the CDL calculated here is Y×M2. A parameter obtained by multiplying this parameter by the matrix Z calculated in step S1702 is adopted as a final color grading correction parameter. The expression of the matrix by which image data is multiplied is Z×$\gamma 1\beta$×Y×M2. Thus, a CDL serving as a gamma set value (input parameter of the second gamma processing unit 1059) is Z×$\gamma 1\beta$, and a CDL serving as color correction (input parameter of a second color correction processing unit 1058 in FIG. 13) is Y×M2.

Finally, in step S1406, the system control unit 350 records the corrected CDL on a recording medium 304 by overwriting the original CDL with the corrected CDL.

By performing the above-described processing, the CDL described in color grading information can be corrected when generating color grading information, regardless of color space processing, gamma processing, and the like for image data to undergo color grading.

The embodiment adopts the configuration in which shooting environment information and generation environment information are compared to detect the difference especially in image processing information such as color space conversion processing or gamma processing, and the CDL is corrected. However, even when a CDL for a different color space or gamma setting is used, the load of color grading processing upon shooting for image data to be actually shot can be reduced.

Accordingly, color space conversion processing, gamma processing, and the like suited to a color grading apparatus used to generate color grading information can be performed.

In the embodiment, a correction parameter for one matrix M1 is calculated in accordance with the difference in color space (matrix of the color space conversion unit 1056 in FIG. 13). However, the color space conversion matrix may be constructed by a plurality of matrices. For example, assume that the color space conversion unit 1056 in FIG. 13 handles image data converted into the ACES color space. The ACES color space aims at converting image data into a reference state (ACES color space and color target value) and generating an image by using the same parameters regardless of the individual differences of a camera and color grading apparatus. To realize this, color space conversion is performed by performing processing called IDT processing of excluding the individual difference of an apparatus. The main contents of the IDT processing are gamma processing, light source correction, color balance correction to a target value, and conversion processing into the ACES space. Thus, the color space conversion unit 1056 in FIG. 13 performs matrix processing not by using one matrix M1 but by dividing it into a plurality of matrices, thereby changing the color space of image data. In this case, information about a matrix used for processing among a plurality of color conversion matrices is described as environment information in color grading information. Thus, even if there is a difference in environment information, it may be determined not to correct the CDL, in accordance with matrix information assigned in ACES color space conversion. For example, when image data B undergoes ACES conversion by multiplying image data B by a matrix regarding IDT processing of light source correction, even if the light source color temperature differs between shooting environment information and generation environment information, the CDL is not corrected in regard to the light source color temperature. This is because the ACES space is free from the influence of the light source color temperature between image data A and image data B. In other words, environment information for which the CDL is corrected may be changed depending on each space.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-042360, filed Mar. 4, 2013 which is hereby incorporated by reference herein in its entirety.

What is claimed is:

1. An image processing apparatus comprising:
a processor configured to control execution of the following processes:
a process of inputting captured image data and shooting environment information representing an environment at the time of shooting of the captured image data;
a process of acquiring a predetermined parameter for adjusting an image quality, and reference environment information serving as a reference when adjusting the image quality by applying the predetermined parameter to the captured image data;
a process of adjusting the image quality by using the predetermined parameter;
a process of determining, based on a difference between the reference environment information and the shooting environment information whether adjustment by the predetermined parameter can be applied; and
wherein the process of adjusting the image quality is performed by using the predetermined parameter when the difference is not more than a predetermined value, and a warning is issued when the difference is greater than the predetermined value.

2. The apparatus according to claim 1, further comprising a correction unit configured to correct the parameter when the difference between the reference environment information and the shooting environment information does not fall within a predetermined range.

3. The apparatus according to claim 2, further comprising a recording unit configured to record the parameter corrected by the correction unit.

4. The apparatus according to claim 1, the processor further controls execution of a process of determining, based on the difference between the reference env or ent information and the shooting environment information, whether the parameter can be corrected, and when the parameter is determined not to be able to be corrected, notify that the parameter cannot be corrected.

5. The apparatus according to claim 1, wherein the reference environment information and the shooting environment information are information about a color temperature.

6. An image processing apparatus comprising:
a shooting unit configured to output captured image data; and
a processor configured to control execution of the following processes:
a process of setting a predetermined parameter for adjusting an image quality of the captured image data, and reference environment information serving as a reference when adjusting the image quality by applying the predetermined parameter to the captured image data;
a process of acquiring shooting environment information representing an environment at the time of shooting of the captured image data by the shooting unit; and
a process of recording, on a recording medium in association with the captured image data output by the shooting unit, the predetermined parameter and the reference environment information that are set in the process of setting, and the shooting environment information..

7. The apparatus according to claim 6, wherein the reference environment information and the shooting environment information are information about a color temperature.

8. An image processing method comprising:
inputting captured image data and shooting, environment information representing an environment at the time of shooting of the captured image data;
acquiring a predetermined parameter for adjusting an image quality, and reference environment information serving as a reference when adjusting the image quality by applying the predetermined parameter to the captured image data;
adjusting the image quality by using the predetermined parameter;
determining, based on a difference between the reference environment information and the shooting environment information,whether adjustment by the predetermined parameter can be applied; and
wherein the process of adjusting the image quality is performed by using the predetermined parameter when the difference is not more than a predetermined value, and a warning is issued when the difference is greater than the predetermined value.

9. An image processing method comprising:
outputting captured image data;
setting a predetermined parameter for adjusting an image quality of the captured image data, and reference environment information serving as a reference when adjusting the image quality by applying the predetermined parameter to the captured image data;
acquiring shooting environment information representing an environment at the time of shooting of the captured image data by the shooting unit; and
recording, on a recording, medium in association with the captured image data output by shooting, the set predetermined parameter and the reference environment information; and the shooting environment information.

* * * * *